US012634411B2

(12) United States Patent
Fang et al.

(10) Patent No.: US 12,634,411 B2
(45) **Date of Patent: *May 19, 2026**

(54) AUTOMATED FOLLOWER DEVICE ACTIVATION AND DEACTIVATION FOR VIDEO CONFERENCING

(71) Applicant: Zoom Communications, Inc., San Jose, CA (US)

(72) Inventors: Jin Fang, Saratoga, CA (US); Ashley Alexandra Hellmann, San Francisco, CA (US); Robert Aaron Klegon, Chicago, IL (US); Cynthia Eshiuan Lee, Austin, TX (US); Nicholas P. Mueller, Fitchburg, WI (US); Stephen George Newton, San Jose, CA (US); Shane Paul Springer, Oregon City, OR (US)

(73) Assignee: Zoom Communications, Inc., San Jose, CA (US)

(*) Notice: Subject to any disclaimer, the term of this patent is extended or adjusted under 35 U.S.C. 154(b) by 245 days.

This patent is subject to a terminal disclaimer.

(21) Appl. No.: 18/362,850

(22) Filed: Jul. 31, 2023

(65) Prior Publication Data

US 2025/0047807 A1     Feb. 6, 2025

(51) Int. Cl.
*H04N 7/15*          (2006.01)
*H04L 12/18*         (2006.01)

(52) U.S. Cl.
CPC ........... *H04N 7/15* (2013.01); *H04L 12/1822* (2013.01); *H04L 12/1827* (2013.01)

(58) Field of Classification Search
CPC .......... H04N 7/15; H04N 7/142; H04N 7/147; H04N 7/152; H04L 12/1822; H04L 12/1827
See application file for complete search history.

(56) References Cited

U.S. PATENT DOCUMENTS

| | | | |
|---|---|---|---|
| 7,119,829 B2 | 10/2006 | Leonard et al. | |
| 9,106,975 B1 | 8/2015 | Gildfind et al. | |
| 9,690,465 B2 | 6/2017 | Tuck et al. | |
| 9,942,514 B1 * | 4/2018 | Panwar | ............... H04W 52/028 |

(Continued)

OTHER PUBLICATIONS

International Search Report and Written Opinion mailed on Oct. 24, 2024 in corresponding PCT Application No. PCT/US2024/040110.

(Continued)

*Primary Examiner* — Stella L. Woo
(74) *Attorney, Agent, or Firm* — Young Basile Hanlon & MacFarlane, P.C.

(57) ABSTRACT

Follower devices within a physical space are automatically activated and/or deactivated during a video conference. The follower devices are paired to a leader device within the physical space to enable a companion mode designation for the follower devices during a video conference. Based on a connection of the leader device to the video conference and based on the pairing between the leader device and a follower device of the follower devices, an event associated with the follower device is determined. Based on the event and the companion mode designation of the follower device, an action associated with the follower device is performed. The leader device and the follower devices are collectively represented as a single logical entity to the video conference.

20 Claims, 20 Drawing Sheets

(56) References Cited

U.S. PATENT DOCUMENTS

| | | | |
|---|---|---|---|
| 9,998,580 B2 | 6/2018 | Brogan et al. | |
| 10,027,926 B1* | 7/2018 | Schirdewahn | H04W 4/02 |
| 10,075,672 B2 | 9/2018 | Pell | |
| 10,165,391 B2 | 12/2018 | Krochmal et al. | |
| 10,489,414 B2 | 11/2019 | Kollenkark et al. | |
| 10,867,610 B2 | 12/2020 | Diamant et al. | |
| 11,012,498 B1 | 5/2021 | Hinnant et al. | |
| 11,652,958 B1 | 5/2023 | Geddes et al. | |
| 11,677,906 B2 | 6/2023 | Lee et al. | |
| 11,863,906 B2 | 1/2024 | Han et al. | |
| 2008/0088698 A1 | 4/2008 | Patel et al. | |
| 2009/0150553 A1 | 6/2009 | Collart et al. | |
| 2013/0106975 A1 | 5/2013 | Chu et al. | |
| 2013/0136089 A1 | 5/2013 | Gillett et al. | |
| 2014/0176665 A1* | 6/2014 | Gottlieb | H04L 65/403 |
| | | | 709/204 |
| 2014/0253671 A1 | 9/2014 | Bentley et al. | |
| 2015/0381673 A1 | 12/2015 | Ding | |
| 2016/0088259 A1 | 3/2016 | Anderson et al. | |
| 2016/0104122 A1 | 4/2016 | Mande et al. | |
| 2016/0150575 A1 | 5/2016 | Andersen et al. | |
| 2016/0277708 A1* | 9/2016 | Rintel | H04N 7/147 |
| 2017/0310933 A1* | 10/2017 | Vendrow | H04N 7/152 |
| 2018/0007097 A1 | 1/2018 | Malatesha et al. | |
| 2018/0124128 A1 | 5/2018 | Faulkner et al. | |
| 2018/0124136 A1* | 5/2018 | Faulkner | H04N 7/15 |
| 2018/0203577 A1 | 7/2018 | Astavans et al. | |
| 2019/0341050 A1 | 11/2019 | Diamant et al. | |
| 2021/0136129 A1 | 5/2021 | Ponnusamy et al. | |
| 2021/0136846 A1 | 5/2021 | Ponnusamy et al. | |
| 2021/0210097 A1 | 7/2021 | Diamant et al. | |
| 2021/0400142 A1 | 12/2021 | Jorasch et al. | |
| 2022/0319032 A1* | 10/2022 | Fan | G10L 25/78 |
| 2022/0353305 A1 | 11/2022 | Han et al. | |
| 2023/0081041 A1 | 3/2023 | Lee et al. | |
| 2023/0247067 A1 | 8/2023 | Adams et al. | |
| 2023/0308602 A1 | 9/2023 | Wang et al. | |
| 2024/0073372 A1 | 2/2024 | Lin et al. | |
| 2024/0098094 A1 | 3/2024 | Nagar et al. | |
| 2024/0214232 A1 | 6/2024 | Reszka et al. | |

OTHER PUBLICATIONS

Bosch, Dicentis Conference system, White Paper: OMNEO, https://media.boschsecurity.com/fs/media/en/pb/media/products_1/conference_systems_1/OMNEO_White_paper.pdf, Bosch Security Systems B.V., Jan. 2019, 18 pages.

Microsoft, Plan Microsoft Teams Rooms, https://learn.microsoft.com/en-us/microsoftteams/rooms/rooms-plan, Tony Smit et al., May 4, 2023, 4 pages.

Microsoft Mobile Sharing and Companion Experiences for Microsoft Teams Meetings, Use your computer and phone together in video meetings, https://www.microsoft.com/en-us/garage/wall-of-fame/companionexperiences/, Aug. 5, 2021, 8 pages.

* cited by examiner

1600

1602 — OBTAIN CONFIGURATION LOGIC FOR VIDEO CONFERENCE

1604 — AUTHENTICATE ONE OR MORE FOLLOWER DEVICES FOR VIDEO CONFERENCE

1606 — DESIGNATE FOLLOWER DEVICE(S) IN A COMPANION MODE ENABLING LEADER DEVICE CONTROL

1608 — CAUSE OUTPUT OF FIRST CONTENT OF VIDEO CONFERENCE FOR DISPLAY AT FOLLOWER DEVICE(S)

1610 — CAUSE CAPTURE BY FOLLOWER DEVICE(S) OF SECOND CONTENT TO SHARE TO REMOTE DEVICE(S)

1700

1702 — OBTAIN CONFIGURATION LOGIC FOR VIDEO CONFERENCE

1704 — PAIR FOLLOWER DEVICES TO LEADER DEVICE TO ENABLE COMPANION MODE DESIGNATION FOR FOLLOWER DEVICES

1706 — DETERMINE EVENT ASSOCIATED WITH FOLLOWER DEVICE

1708 — PERFORM ACTION ASSOCIATED WITH FOLLOWER DEVICE BASED ON EVENT

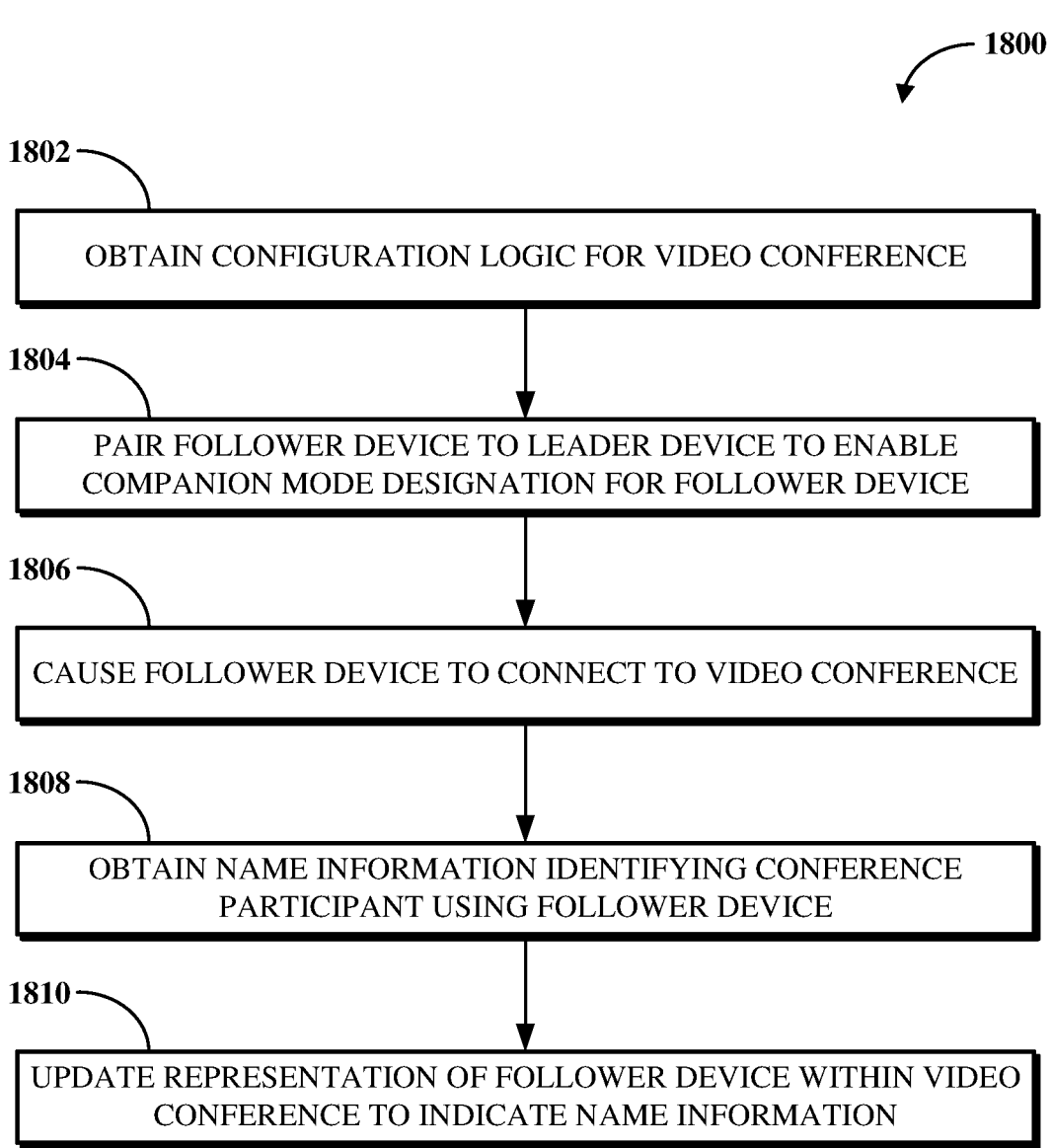

1800

1802 — OBTAIN CONFIGURATION LOGIC FOR VIDEO CONFERENCE

1804 — PAIR FOLLOWER DEVICE TO LEADER DEVICE TO ENABLE COMPANION MODE DESIGNATION FOR FOLLOWER DEVICE

1806 — CAUSE FOLLOWER DEVICE TO CONNECT TO VIDEO CONFERENCE

1808 — OBTAIN NAME INFORMATION IDENTIFYING CONFERENCE PARTICIPANT USING FOLLOWER DEVICE

1810 — UPDATE REPRESENTATION OF FOLLOWER DEVICE WITHIN VIDEO CONFERENCE TO INDICATE NAME INFORMATION

1902 — OBTAIN CONFIGURATION LOGIC FOR VIDEO CONFERENCE

1904 — DESIGNATE MULTIPLE DISPLAYS AT PHYSICAL SPACE AS FOLLOWER DEVICES TO ENABLE LEADER DEVICE CONTROL

1906 — CAUSE OUTPUT OF FIRST VISUAL DATA ASSOCIATED WITH VIDEO CONFERENCE AT FIRST DISPLAY

1908 — CAUSE OUTPUT OF SECOND VISUAL DATA ASSOCIATED WITH VIDEO CONFERENCE AT SECOND DISPLAY

2000

2002 — OBTAIN CONFIGURATION LOGIC FOR VIDEO CONFERENCE

2004 — IDENTIFY MULTIPLE CAMERAS CONNECTED TO LEADER DEVICE AT PHYSICAL SPACE

2006 — DESIGNATE CAMERAS AS FOLLOWER DEVICES TO ENABLE LEADER DEVICE CONTROL

2008 — CAUSE EACH CAMERA TO DETERMINE AND CAPTURE SELECT VIDEO STREAM

2010 — USE AT LEAST SOME SELECT VIDEO STREAMS TO REPRESENT PHYSICAL SPACE WITHIN VIDEO CONFERENCE

AUTOMATED FOLLOWER DEVICE ACTIVATION AND DEACTIVATION FOR VIDEO CONFERENCING

FIELD

This disclosure generally relates to leader-follower approaches for unifying a conferencing experience within a software-based room system for video conferencing, and, more specifically, to systems and techniques for collectively representing hardware and software components within a physical space used with a software-based room system as a single logical entity in connection with leader-follower approaches for controlling and using those components for video conferencing.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 18 is a flowchart of an example of a technique for authenticating a follower device for leader device control during a video conference.

DETAILED DESCRIPTION

Figure 1:
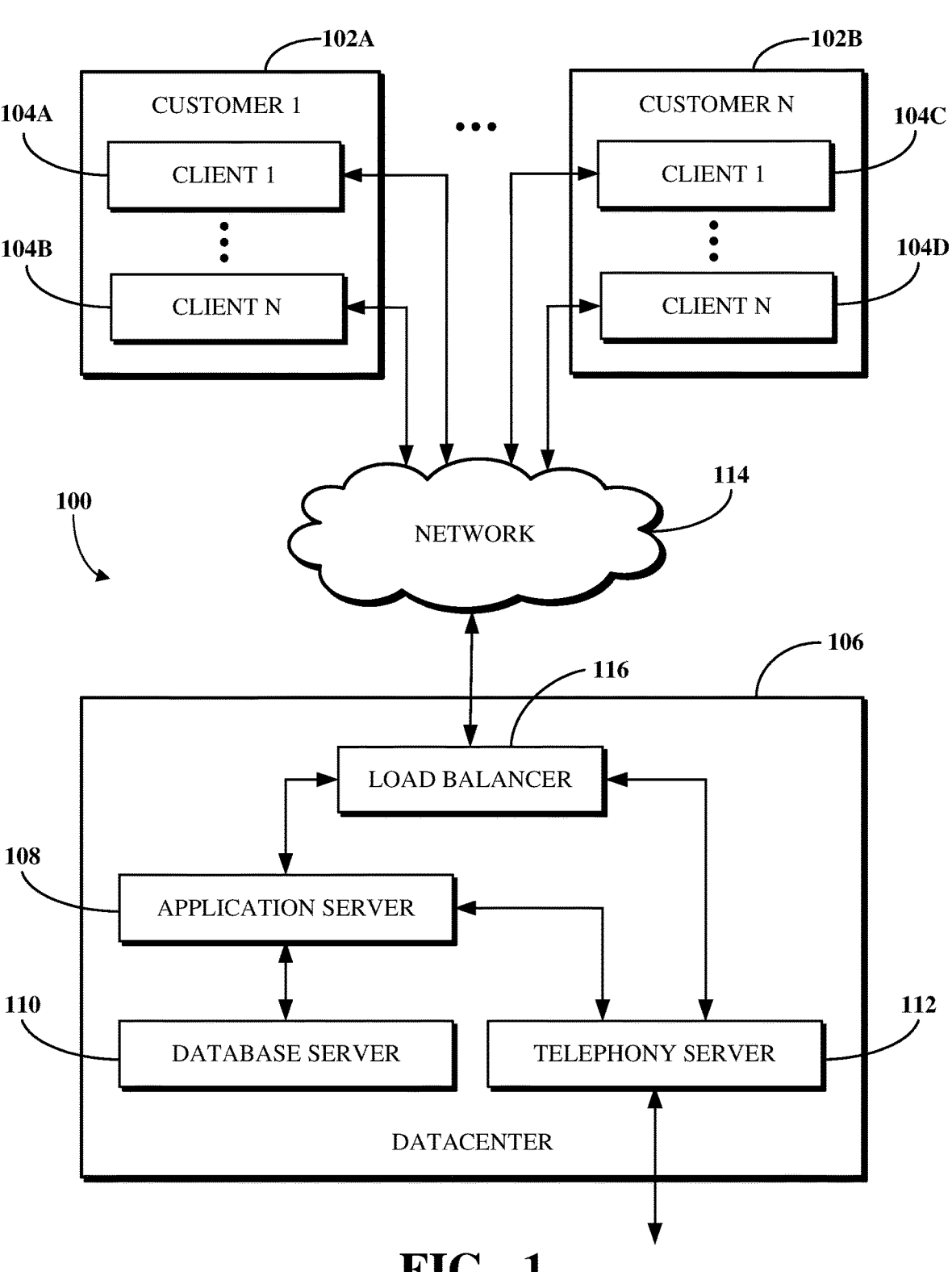
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

In some cases, a physical space may be equipped with a software-based room system to provide an integrated video conferencing experience for conference participants within the physical space. Conventional software-based room systems use a computing device, such as a desktop or laptop computer, to run software for configuring other devices (e.g., one or more cameras and display) of the physical space for use with video conferences. The computing device is also used to connect to server-side conferencing software that facilitates such video conferences to enable anyone in the physical space to participate in a video conference, for example, via the configured other devices. In a simple use case, a single display and a single camera of the physical space may be used. In more complex use cases, multiple displays and/or multiple cameras of the physical space may be used.

However, conventional software-based room systems represent the computing device of the physical space and the other devices configured for use with the computing device as separate logical entities within the video conference. As such, multimedia router (MMR) functionality used with the video conference communicates with each of the devices of the physical space individually. This arrangement presents numerous technical challenges that can undesirably affect the video conferencing experience at least for the conference participants within the physical space. For example, communications between the server-side MMR services and each of the individual devices of the physical space incur network and compute requirements beyond what would exist if a single device were used to coordinate data communication with such MMR services. In another example, because the individual devices are treated as separate logical entities, they are incapable of recognizing interference and other issues presented by their parallel operation, such as audio interference resulting from the combined presence of multiple microphone devices. In yet another example, the communications between individual devices and the MMR functionality results in each of those individual devices being separately listed on a conference participant list for a subject video conference, which can lead to user confusion.

One additional such technical challenge relates to companion devices used with a video conference. Conventional video conferencing and related (e.g., digital whiteboarding) solutions enable users to use certain personal participant devices (e.g., laptops or tablets) in a companion mode, for example, to extend select functionality of the video conference or related activity to those companion devices. Such companion devices are conceptually capable of being used as complete conference devices and thus include components such as a camera and a microphone. However, those camera and microphone components cannot be used by the physical space while in an existing companion mode designation due to design limitations of the companion mode experience; rather, use of such components is limited to the individual users of the companion devices. Despite this, there may be significant value in enabling full use of these components during a video conference, while these companion devices remain in a companion mode. For example, some conference participants located in a large conference room may not be clearly shown in a video stream captured using a camera of the conference room itself (e.g., due to their distance from and angle relative to the camera in the conference room). In such a case, it would be desirable to leverage a camera of a companion device within the conference room for video capture for such a conference participant. While conference participants are capable of connecting their own personal devices to a video conference from within a conference room, to use the cameras and other content capture components thereof, those personal devices would need to be other than in the companion mode.

Implementations of this disclosure address problems such as these using systems for video conferencing that leverage one or more leader-follower approaches for representing multiple devices within a physical space as a single logical entity for a video conference. A computing device located at a physical space is designated as a leader device for a video conference. One or more other devices located at the physical space are designated as follower devices, in which the follower device designation enables the leader device to control one or more functional aspects of a given follower device. For example, configuration logic may be defined for a video conference and for a physical space to indicate the types of follower device functionality that can be controlled by a leader device. The leader device coordinates data communication for itself and authenticated follower devices with server-side service used for the video conference (e.g., with MMR functionality at one or more servers) to orchestrate the use of the follower devices for the video conference. Non-limiting examples of leader device control over follower devices include using a leader device to selectively control the output of certain conference media (e.g., participant video streams) at certain displays, using a leader device to selectively control the capture of video streams using one or more cameras at the physical space, and using a leader device to selectively control the use of certain companion devices and/or their components for content capture and/or display.

To describe some implementations in greater detail, reference is first made to examples of hardware and software structures used to implement a leader-follower system for video conferencing. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
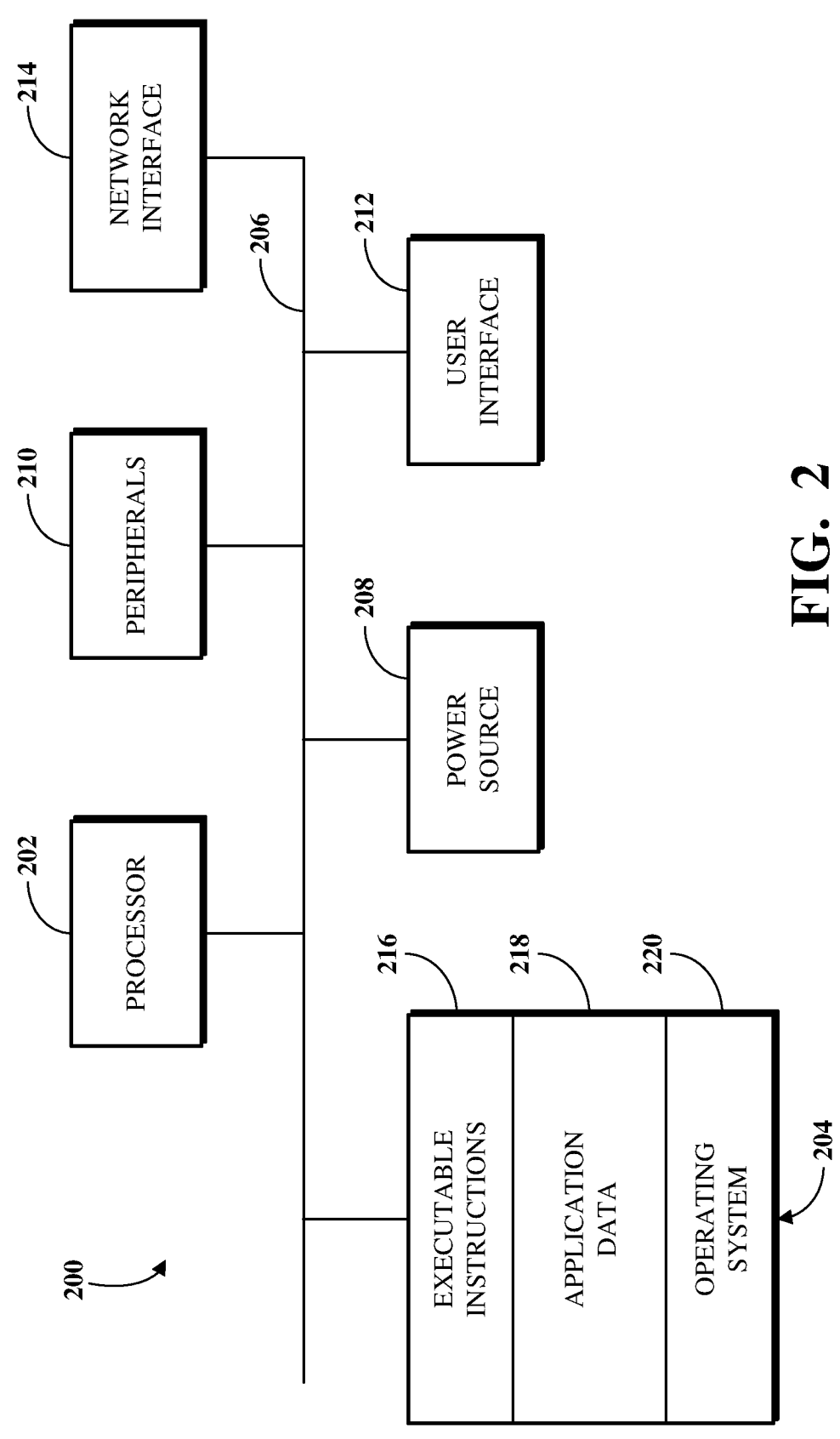
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
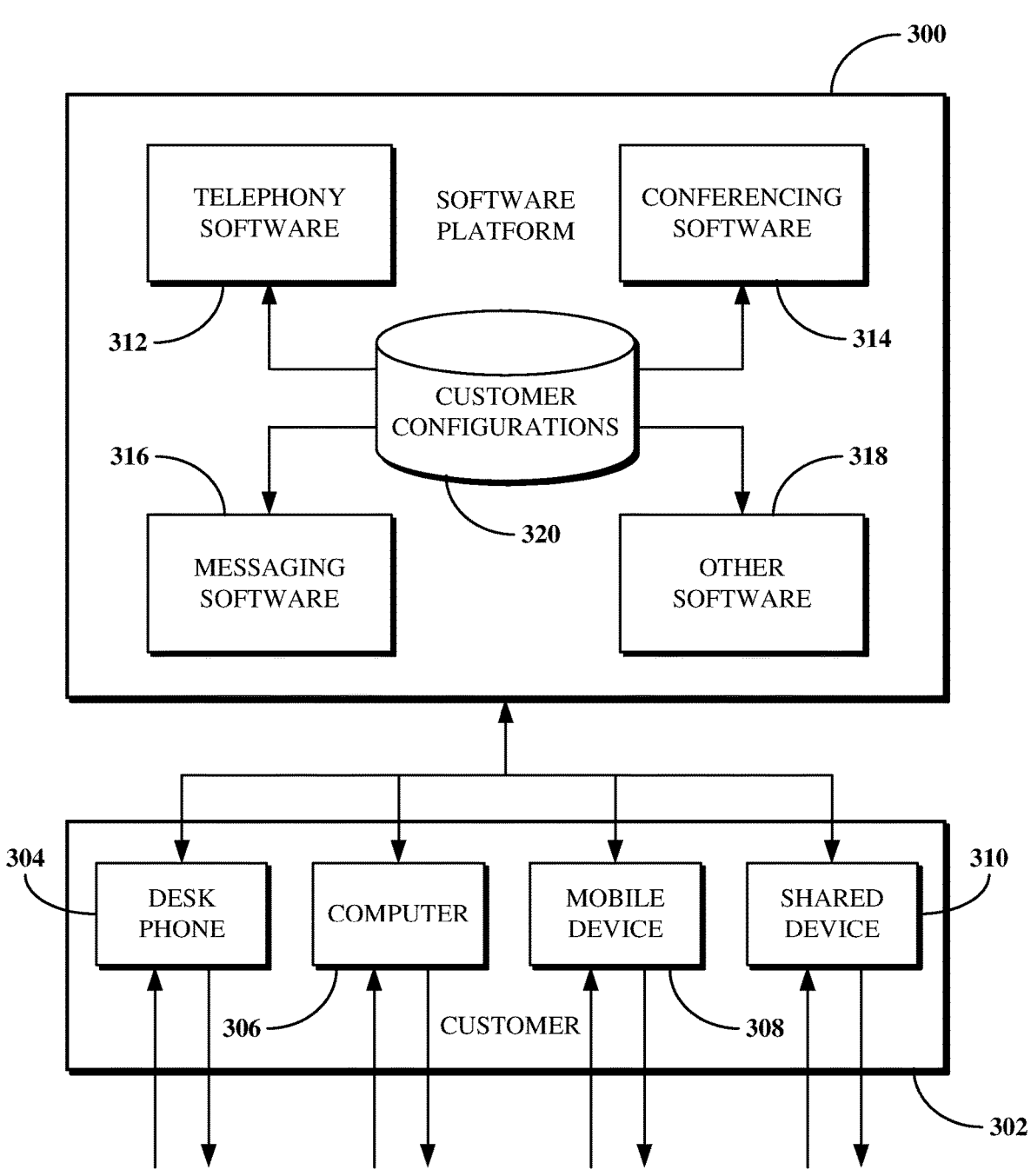
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include leader-follower software as disclosed herein. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
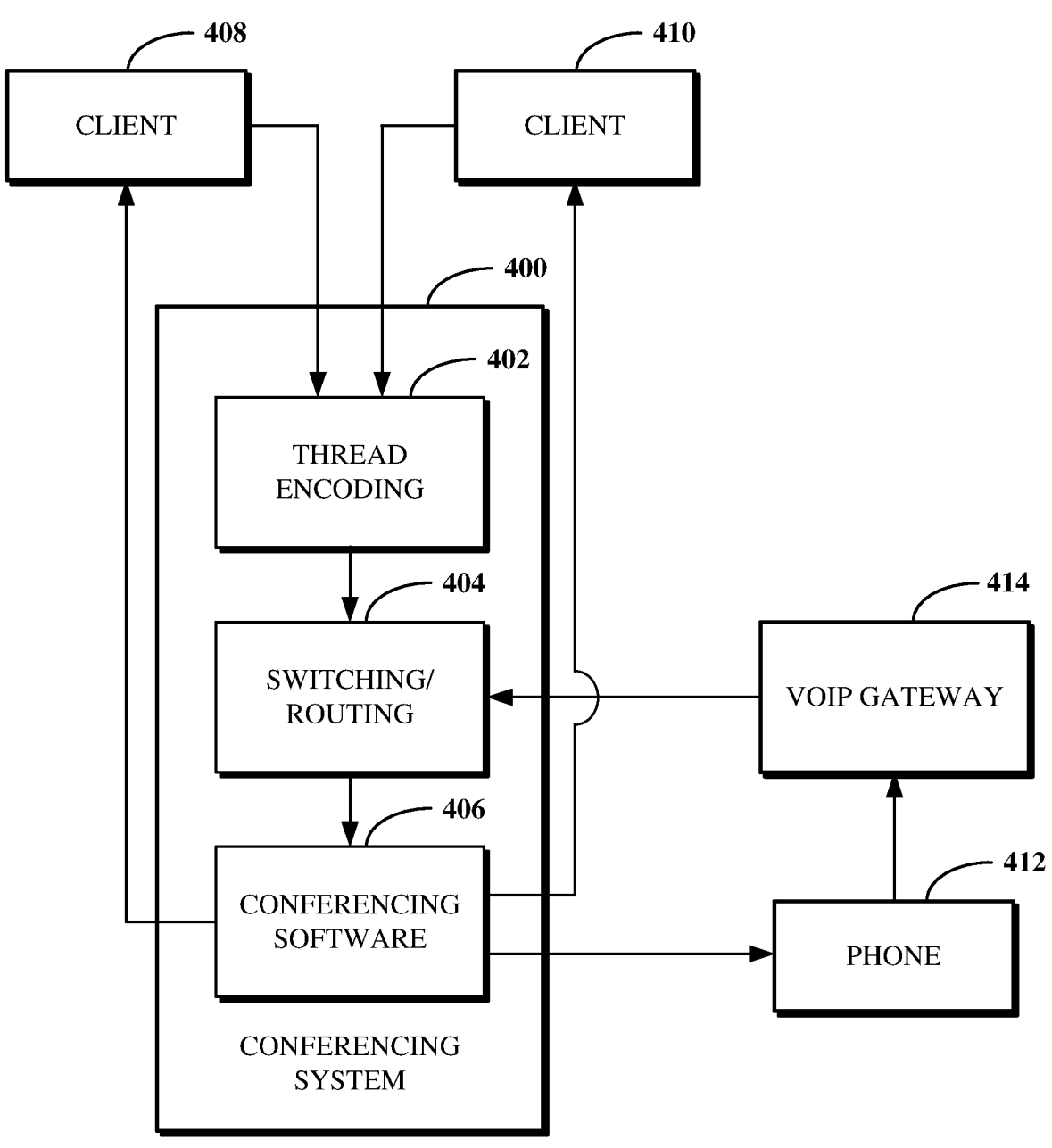
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
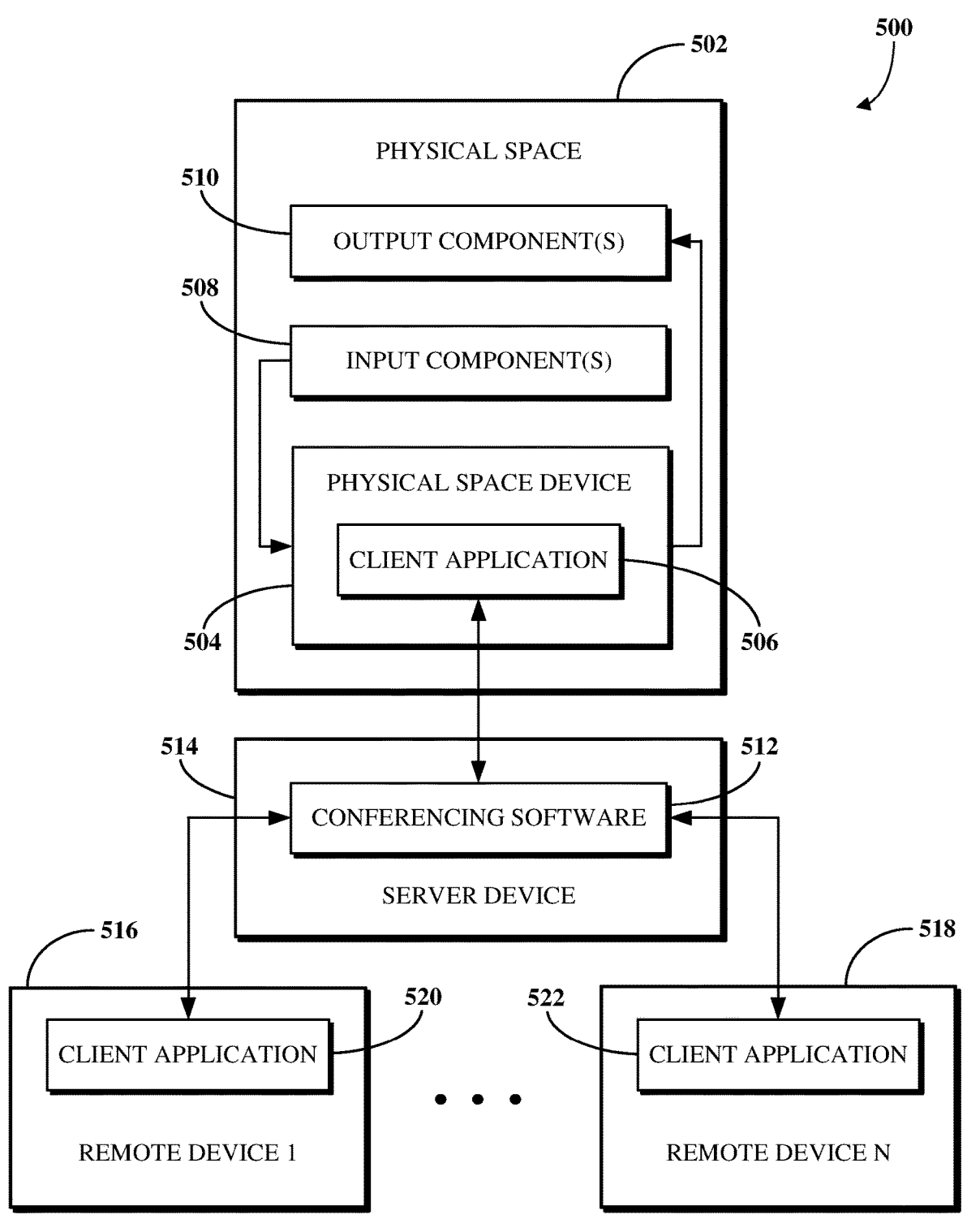
FIG. 5 is a block diagram of an example of a software-based room system for conferencing software services.

FIG. 5 is a block diagram of an example of a software-based room system 500 for conferencing software services, for example, the conferencing software services described with respect to FIGS. 3 and 4. The system 500 includes hardware and software components used to facilitate conferencing experiences within a physical space 502. The physical space 502 is an indoor or outdoor space within which one or more people may be physically located during some or all of a video conference. In one non-limiting example, the physical space 502 may be a conference room.

The physical space 502 includes a physical space device 504, which is a computing device that runs software including a client application 506 configured to connect the physical space device 504 to a video conference. For example, the physical space device 504 may be a client such as one of the clients 304 through 310 shown in FIG. 3 or one of the clients 408 through 410 shown in FIG. 4. While the physical space device 504 is shown as being located within the physical space 502, in some implementations, the physical space device 504 may instead be located external to but remain associated with the physical space 502. The physical space 502 also includes one or more input components 508 and one or more output components 510 usable in connection with a video conference. The one or more input components 508 may, for example, include one or more cameras, microphones, or sensors. The one or more output components 510 may, for example, include one or more displays.

The video conference which the client application 506 connects the physical space device 504 to is implemented by conferencing software 512 running at a server device 514, which may, for example, be a server used with the conferencing system 400 shown in FIG. 4. For example, the conferencing software 512 may be the conferencing software 314 shown in FIG. 3. The video conference is a video-enabled conference with two or more participants in which one or more of those participants are in the physical space 502 and one or more of those participants are remote participants located external to the physical space 502.

As shown, the remote participants connect the video conference via remote devices 1 516 through N 518, in which N is an integer greater than or equal to 2. Each of the remote devices 1 516 through N 518 is a computing device and may, for example, be one of the clients 304 through 310 or one of the clients 408 through 410. Where a single remote device is connected to the video conference, the remote device N 518 (as well as any other remote device other than the remote device 1 516) is omitted. As shown, each of the remote devices 1 516 through N 518 runs a client application 520 through 522, which are software configured to communicate with the conferencing software 512 to enable the users of the remote devices 1 516 through N 518 to participate in the video conference implemented using the conferencing software 512 as remote participants.

The one or more input components 508 capture input (e.g., video data) that is then transmitted to the conferencing software 512 for rendering within a user interface tile of a user interface of the video conference. For example, an input video stream from the physical space device 504 may be processed and output within a user interface tile associated with the physical space 502, and thus with the conference participants located thereat. Similarly, the remote devices 1 516 through N 518 each include one or more capture components, such as a camera, which capture input (e.g., video data) that is then transmitted to the conferencing software 512 for rendering within a user interface tile of a user interface of the video conference. For example, an input video stream from the remote device 1 516 may be processed and output within a user interface tile associated with the remote participant using the remote device 1 516 within the user interface of the video conference and an input video stream from the remote device N 518 may be processed and output within a user interface tile associated with the remote participant using the remote device N 518 within the user interface of the video conference.

In some implementations, one or more of the devices connected to the conferencing software 512 can connect to the video conference implemented by the conferencing software 512 other than by using a client application, such as the client applications 506 and 520 through 522. For example, the physical space device 504 and/or one or more of the remote devices 1 516 through N 518 may connect to the video conference using a web application running through a web browser. In another example, the physical space device 504 and/or one or more of the remote devices 1 516 through N 518 may connect to the video conference using a software application other than a web browser or a client application, for example, a non-client desktop or mobile application.

In some implementations, the client application 514 can omit the leader-follower software 528. For example, the leader-follower software 514 may be implemented at the server 518 instead of at the physical space device 512. In such a case, the client application 514 may obtain instructions for implementing leader-follower configuration logic from the server device 518. In some such cases, the conferencing software 518 may include the leader-follower software 516. In another example, the leader-follower software 514 may be implemented at the physical space device 512 external to the client application 514. For example, the leader-follower software 514 may be implemented as a separate software aspect from the client application 514 but which is configured to operate in connection with the client application 514.

Figure 6:
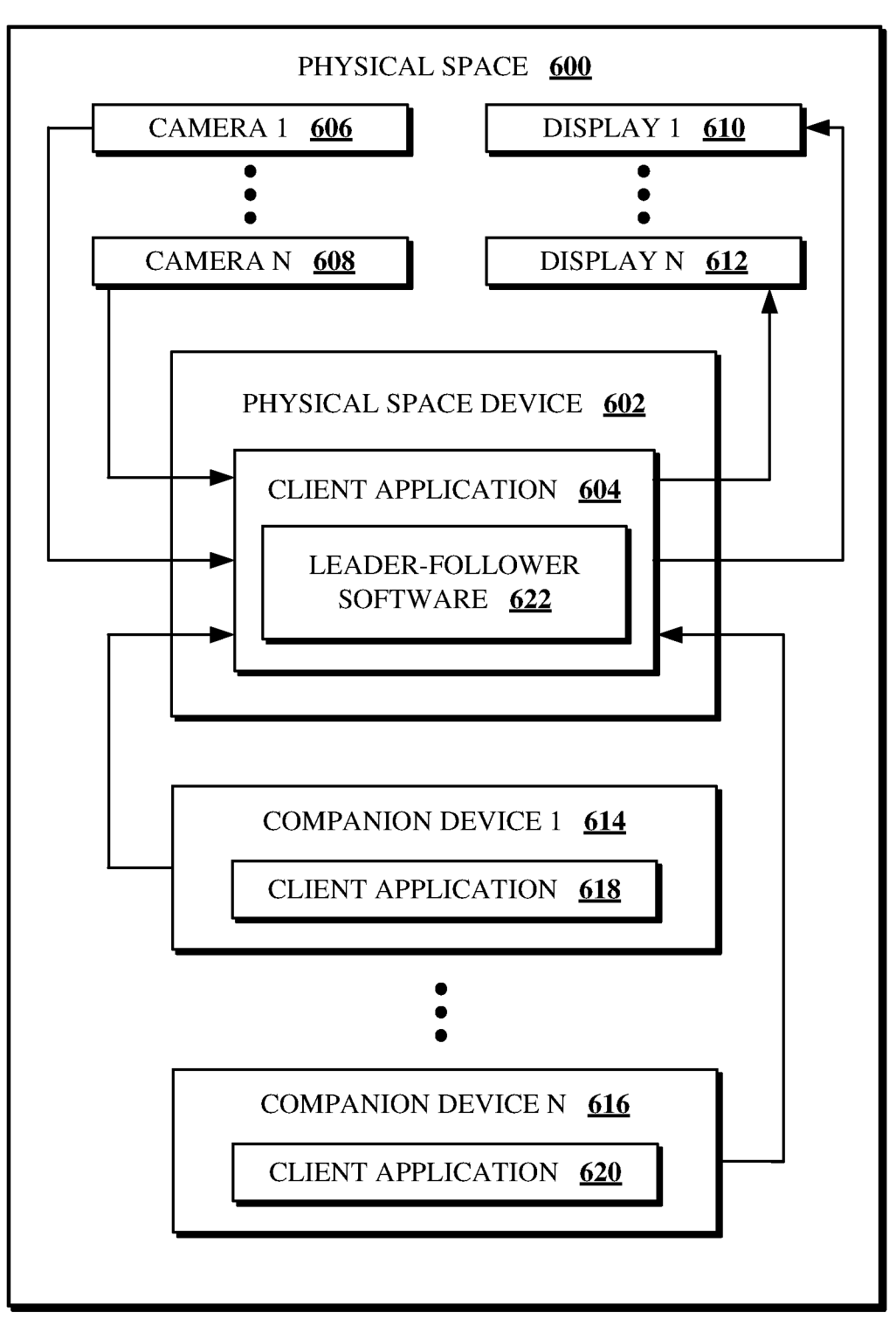
FIG. 6 is a block diagram of an example of components of a physical space associated with a software-based room system.

FIG. 6 is a block diagram of an example of components of a physical space 600 associated with a software-based room system, for example, the system 500 shown in FIG. 5. For example, the physical space 600 may be the physical space 502 shown in FIG. 5. The physical space 600 includes a physical space device 602 that runs a client application 604 configured to connect to a video conference to enable persons located at the physical space 600 to participate in the video conference. For example, the physical space device 602 and the client application 604 may respectively be the physical space device 504 and the client application 506 shown in FIG. 5. The physical space 600 also includes hardware components usable with the physical space device 602 or otherwise in connection with a video conference to which the physical space device 602 may be connected via the client application 604. As shown, the physical space 600 includes cameras 1 606 through N 608, displays 1 610 through N 612, and companion devices 1 614 through N 616, in which the value of N in each case is an integer greater than or equal to 2. However: where the physical space 600 includes a single camera, the camera N 608 (as well as any other cameras other than the camera 1 606) is omitted; where the physical space 600 includes a single display, the display N 612 (as well as any other display other than the display 1 610) is omitted; and where the physical space 600 includes a single companion device, the companion device N 616 (as well as any other companion devices other than the companion device 1 614) is omitted.

The cameras 1 606 through N 608 capture video data of the physical space 600 and transmit that video data as video streams for use with a video conference to the physical space device 602, which, via the client application 604, transmits those video streams to be processed and rendered within one or more user interface tiles of the video conference. The cameras 1 606 through N 608 may, for example, correspond to the one or more input components 508 shown in FIG. 5.

The cameras 1 606 through N 608 are connected to the physical space device 602 using one or more wired and/or wireless connections.

Each of the cameras 1 606 through N 608 has a field of view within the physical space 600 based on an angle and position thereof. For example, the camera 1 606 may be arranged on a first wall of the physical space 600 and have a field of view visible from that first wall while the camera N 608 may be arranged on a second wall of the physical space 600 perpendicular to the first wall and thus have a field of view that is different from that of the camera 1 606. Some or all of the cameras 1 606 through N 608 may be fixed such that their respective fields of view do not change. Alternatively, some or all of the cameras 1 606 through N 608 may have mechanical or electronic pan, tilt, and/or zoom functionality for narrowing, broadening, or changing the field of view thereof. For example, the pan, tilt, and/or zoom functionality of a camera may be electronically controlled, such as by a device operator or by a software intelligence aspect, such as a machine learning model or software which uses a machine learning model for field of view adjustment.

The displays 1 610 through N 612 output media of the video conference (e.g., participant video streams, screen share data, chat messages, user interface elements, whiteboards, participant lists, and the like), received via the client application 604, for viewing by conference participants who are located at the physical space 600. The displays 1 610 through N 612 may, for example, correspond to the one or more output components 510 shown in FIG. 5. The displays 1 610 through N 612 are connected to the physical space device 602 using one or more wired and/or wireless connections.

The displays 1 610 through N 612 may have the same or different media output functionality. For example, in some cases, all of the displays 1 610 through N 612 may have the same video refresh rate, resolution, input capture, and related capabilities. In other cases, however, one or more of the displays 1 610 through N 612 may have capabilities that differ from those of others of the displays 1 610 through N 612. For example, the display 1 610 may have a touch screen interface capable of receiving touch input to manipulate content output thereat while the display N 612 may lack such a touch screen interface. Ones of the displays 1 610 through N 612 may be located next to, nearby, or away from one another within the physical space 600. For example, the display 1 610 may be located on a first wall of the physical space 600 while the display N 612 may be located on a second wall thereof.

The companion devices 1 614 through N 616 are computing devices (e.g., tablet computers, laptop computers, digital whiteboard displays, or the like) located at the physical space 600 and usable in connection with a video conference while under control by the physical space device 602. The companion devices 1 614 through N 616 each include one or more input components (e.g., cameras, microphones, or other sensors) configured to capture input usable with the video conference and one or more output components (e.g., displays) configured to output media associated with the video conference. Thus, in at least some cases, the companion devices 1 614 through N 616 may, for example, correspond to both of the one or more input components 508 and the one or more output components 510. The companion devices 1 614 through N 616 run client applications 618 through 620, respectively, to connect them to the video conference to which the physical space device 602 is connected. The companion devices 1 614 through N 616 are connected to the physical space device 602 using one or more wired and/or wireless connections. In some implementations, the companion devices 1 614 through N 616 may be omitted.

The companion devices 1 614 through N 616 may be physically coupled to furniture or other physical aspects within the physical space 600. For example, some or all of the companion devices 1 614 through N 616 may be affixed (e.g., via mounting, docks, fasteners, or the like) to areas of a conference room table. To illustrate, a conference room table may have a companion device located in front of each seat such that anyone who sits in any seat of the conference room, as the physical space 600, may have access to a companion device. In some such cases, however, the companion devices may be limited to only certain seats around the conference room table. Alternatively, the companion devices 1 614 through N 616 may be entirely mobile and thus movable by users thereof without needing to remove the companion devices 1 614 through N 616 from any units or otherwise deform any coupling mechanisms which may otherwise be used to affix the companion devices 1 614 through N 616 about the physical space 600. To illustrate, the companion devices 1 614 through 616 may be made available to conference participants via a physical storage accessible within or nearby the physical space 600, and participants may accordingly bring a companion device to their seat for use during a video conference, as instructed or desired.

The hardware and software components of the physical space 600 are used in one or more leader-follower approaches in which a leader device is configured to control one or more aspects of one or more follower devices. Under a leader-follower approach, applicable components (i.e., the leader device and any follower devices) are represented within a video conference as a single logical entity. Thus, the applicable components are represented collectively as a single conference participant to the video conference (e.g., within a participant list of the video conference). This arrangement avoids confusion that may otherwise arise from conventional video conferencing approaches which require or otherwise cause individual components located in a common space to be represented as separate logical entities and thus separate participants to the video conference. This arrangement may also, in at least some cases, enable a user of the leader device or of any authenticated follower device to initiate a subject video conference. Thus, whereas prior approaches without this leader-follower model require separate control operations to manually manipulate individual components, under this leader-follower model, a leader device may be configured to control any follower devices because they are collectively represented as a single logical entity. In at least some cases, the representation of a leader device and one or more follower devices as a single logical entity enables a single device (i.e., the leader device) to coordinate the redistribution of media and like data from itself and the follower device(s) to a server-side service facilitating the video conference (e.g., the conferencing software 514 or other MMR functionality of the server 516 or another server) and to itself and the follower device(s) from the server-side service.

In the example shown, the physical space device 602 is the leader device and each of the cameras 1 606 through N 608, the displays 1 610 through N 612, and the companion devices 1 614 through N 616 is a follower device. Thus, the physical space device 602 is configured to control functionality associated with each of the cameras 1 606 through N 608, the displays 1 610 through N 612, and the companion devices 1 614 through N 616. In cases where ones of the cameras 1 606 through N 608, the displays 1 610 through N 612, and the companion devices 1 614 through N 616 are omitted from the physical space 600, the physical space device 602 will not be configured to control the omitted components. The physical space device 602, as the leader device, is configured to control the follower devices via leader-follower software 622. The leader-follower software 622 is shown as being included in the client application 604. However, in some implementations, the leader-follower software 622 may wholly or partially exist (e.g., be run) elsewhere.

While the components shown within the physical space 600 are hardware components, as described above, components used in the leader-follower approaches disclosed herein may be hardware or software components. Non-limiting examples of such software components include applications running at displays (e.g., smart television apps), clients running on devices, intelligence units running on devices and used by those devices to facilitate functionality of those devices, or the like.

While leader-follower approaches as disclosed herein describe the selection and use of a leader device (e.g., the physical space device 602) for controlling follower devices, in some implementations, a leader device may be omitted. For example, server-side software (e.g., running at the server device 514 shown in FIG. 5) may instead operate as a leader device for purposes of a video conference and thus control the follower devices. This may, for example, reduce or otherwise avoid a high bandwidth data handoff otherwise required from a leader device at the physical space 600. Such server-side software can operate on-premises (e.g., at a premises which includes the physical space 600), at an edge device accessible to devices of the physical space 600, or in a cloud environment accessible to such devices.

Figure 7:
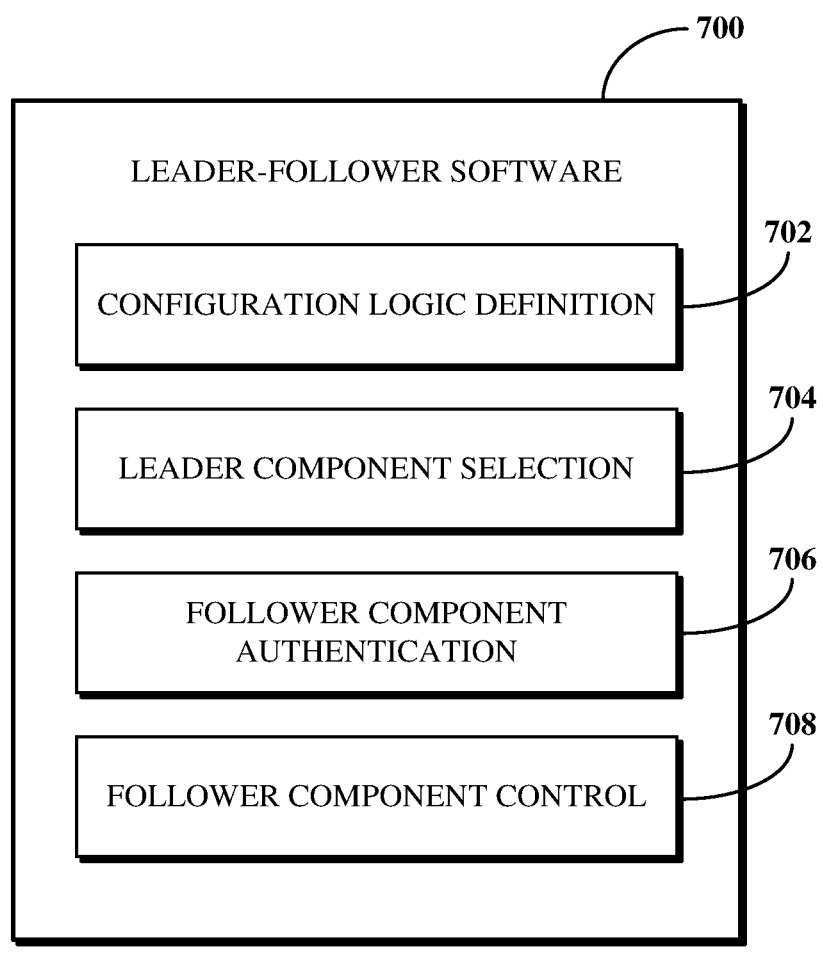
FIG. 7 is a block diagram of an example of functionality of leader-follower software usable with a software-based room system.

FIG. 7 is a block diagram of an example of functionality of leader-follower software 700 usable with a software-based room system, for example, the system 500 shown in FIG. 5. The leader-follower software 700 may, for example, be the leader-follower software 622 shown in FIG. 6. The leader-follower software 700 includes tools, such as programs, subprograms, functions, routines, subroutines, operations, and/or the like, for enabling a leader-follower model across hardware and software components of a physical space (e.g., the physical space 600 shown in FIG. 6) by configuring a leader device (e.g., the physical space device 602 shown in FIG. 6) to control one or more aspects of one or more follower devices (e.g., the cameras 1 606 through N 608, the displays 1 610 through N 612, and the companion devices 1 614 through N 616 shown in FIG. 6) in connection with a video conference. As shown, the leader-follower software 700 includes a configuration logic definition tool 702, a leader device selection tool 704, a follower device authentication tool 706, and a follower device control tool 708.

The configuration logic definition tool 702 defines configuration logic for using a leader device to control one or more follower devices. As used herein, configuration logic is, includes, or otherwise refers to a bound or unbound set or other group of one or more rules, commands, or the like for indicating manners by which a leader device is to control one or more follower devices in connection with one or more video conferences. The configuration logic may, for example, describe the types of follower devices which can be controlled, the functionality of the follower devices which can be controlled, the functionality of a video conference which can be used with certain specified or unspecified follower devices, the types of data which may be communicated between the leader device and the follower devices, the manners by which follower devices may connect to a video conference, software which may be used at or otherwise with a follower device during a video conference, requirements or conditions for using a follower device to capture or present media associated with the video conference, or the like. The configuration logic is not limited to a particular structure or format. By non-limiting example, the configuration logic may be comprised of one or more of text (e.g., in plaintext, comma separated values (CSVs), JavaScript Object Notation (JSON)), computer code or other instructions (e.g., JavaScript or other scripting language instructions, or the like.

The configuration logic definition tool 702 may define the configuration logic automatically (i.e., without manual user intervention). For example, the configuration logic definition tool 702 may define (e.g., generate) the configuration logic based on a conference invitation indicating a scheduling of a video conference within the subject physical space and based on a representation of hardware and software components associated with that physical space (e.g., based on stored data indicating those components). Alternatively, the logic configuration definition tool 702 may define the configuration logic manually (i.e., using input manually provided by a user of the leader-follower software 700). For example, a device user (e.g., a user of a leader device) may use a user interface of a client application, website, or the like to input information usable to define the configuration logic. In some such cases, a form including checkboxes selectable by the device user may be used to collect the input. The configuration logic defined using the configuration logic definition tool 702 may be stored in a data store accessible by one or more of a leader device, a server device (e.g., running the conferencing software used to facilitate a video conference), or another device configured to access the software platform. In some cases, the configuration logic may be stored for use with the physical space for future video conferences. For example, the configuration logic may be stored as a template for future video conferences at the same or a different physical space to enable easy configuration of a same set of devices.

The leader device selection tool 704 selects the leader device to use for the subject video conference within the subject physical space. Selecting the leader device includes designating a component of the physical space as the leader device for the video conference. The leader device selection tool 704 can select the leader device automatically (i.e., without manual user intervention). For example, where the configuration logic defined for the video conference indicates a leader device or where data associated with the physical space indicates a component frequently or otherwise previously used as a leader device, the leader device selection tool 704 may automatically select that device as the leader device. Alternatively, the leader device selection tool 704 can instead select the leader device manually (i.e., using input manually provided by a user of the leader-follower software 700). For example, a device user (e.g., a user of a leader device) may use a user interface of a client application, website, or the like to input information usable to indicate the component of the physical space to designate as the leader device for the video conference. In some cases, the input indicative of the component to be designated as the leader device may be included in the input used to define the configuration logic for the video conference.

In some cases, the leader device selection tool 704 may also select a secondary leader device for the video conference. The secondary leader device may be selected for use in the event of a failure situation in which the selected leader device is or becomes unavailable for the video conference. For example, the secondary leader device can be designated to take over as the leader device for the remainder of the video conference via a failover configuration. In some such cases, the secondary leader device may have its control, established based on the failure of the selected leader device, revoked to return same to the selected leader device where the selected leader device becomes available again during the video conference. The secondary leader device may be selected in the same or a similar manner as the selected leader device (e.g., via the automatic or manual processes described above).

The follower device authentication tool 706 authenticates one or more follower devices of the subject physical space for use with the subject video conference. Authenticating a follower device for use with a video conference includes validating (e.g., determining) that the follower device is configured to access the video conference. In particular, the authentication of a follower device establishes a logical relationship between the follower device and the subject leader device for use during the video conference such that the leader device and any authenticated follower devices may be represented as a single logical entity.

In some cases, a follower device may be authenticated based on a determination that the follower device is paired or otherwise connected to the leader device before the video conference begins or during the video conference. For example, the follower device may be paired to the leader device using ultrasonic pairing, Bluetooth pairing, or another short range, wireless pairing service or protocol. In another example, the follower device may connect to the leader device via wired or wireless communication, such as using one or more cables (e.g., a universal serial bus (USB) cable or a category cable (e.g., via an Ethernet connection)) or a Wi-Fi connection. Alternatively, or additionally, where a common conferencing software (e.g., UCaaS platform) account is used to successfully log in to a client application at both the leader device and a follower device, the follower device may be authenticated based on that successful login before the video conference begins or during the video conference. For example, the account may correspond to an entity (e.g., a customer of a UCaaS platform) with which the physical space is associated (e.g., a company that uses or otherwise operates the physical space). Further alternatively, or further additionally, data associated with the physical space and the video conference may be used to authenticate a follower device before the video conference begins or during the video conference. For example, scheduling information associated with the video conference and known device information identifying devices not selected as the leader device can be used to authenticate one or more other known devices of the physical space as follower devices upon the video conference being scheduled or otherwise at or prior to a start time of the video conference. In another example, such scheduling information and known device information can be used to authenticate a follower device during the video conference, such as based on the follower device being activated for use during the video conference (e.g., by the follower device being turned on and/or paired or otherwise connected to the leader device).

The follower device control tool 708 enables the leader device selected for a subject video conference within a physical space to control one or more follower devices authenticated for the video conference. The follower device control tool 708 asserts the configuration logic defined for the video conference against the selected leader device and the one or more authenticated follower devices to indicate or otherwise establish the manner or manners by which the selected leader device can control the one or more authenticated follower devices. For example, asserting the configuration logic can include configuring the leader device to control the one or more follower devices according to the functionality defined within the configuration logic. Non-limiting examples of this control can include the leader device controlling one or more follower devices to cause the one or more follower devices to capture video streams and transmit the video streams for use with the video conference (i.e., where one or more follower devices are video capture devices such as cameras), controlling one or more follower devices to cause the one or more follower devices to output media of the video conference for display thereat (i.e., where one or more follower devices are media output devices such as displays), and/or controlling one or more follower devices for use in a companion mode to enable conference participant use thereof during the video conference (i.e., where one or more follower devices are companion devices (e.g., computing devices designated in a companion mode)). The follower device control tool 708 enables the leader device to maintain the applicable controls over the subject one or more follower devices throughout the video conference. The control enabled by the follower device control tool 708 may be revoked upon an end of the video conference (e.g., based on a scheduled end time of the video conference or upon a host of the video conference indicating to end the video conference). In some cases, the control over a follower device enabled by the follower device control tool 708 may be discontinued during the video conference, for example, where the follower device goes offline, disconnects from the leader device, unpairs from the leader device, or powers off. At all times during the video conference while the follower device control tool 708 enables control of a follower device by the leader device, the leader device and the follower device (along with any other follower devices authenticated for the video conference) are represented as a single logical entity.

Although the tools 702 through 708 are shown as separate tools, in some implementations, two or more of the tools 702 through 708 may be combined into a single tool. Although the tools 702 through 708 are shown as functionality of the leader-follower software 700 as a single piece of software, in some implementations, some or all of the tools 702 through 708 may exist outside of the leader-follower software 700, or the leader-follower software 700 may be implemented as multiple software aspects running at the same or different computing devices. In some such implementations, one or more of the tools 702 through 708 may be run as software at a physical space device (e.g., the physical space device 604 shown in FIG. 6) while others of the tools 702 through 708 may be run as software at a server (e.g., the server device 514 shown in FIG. 5).

Figure 8:
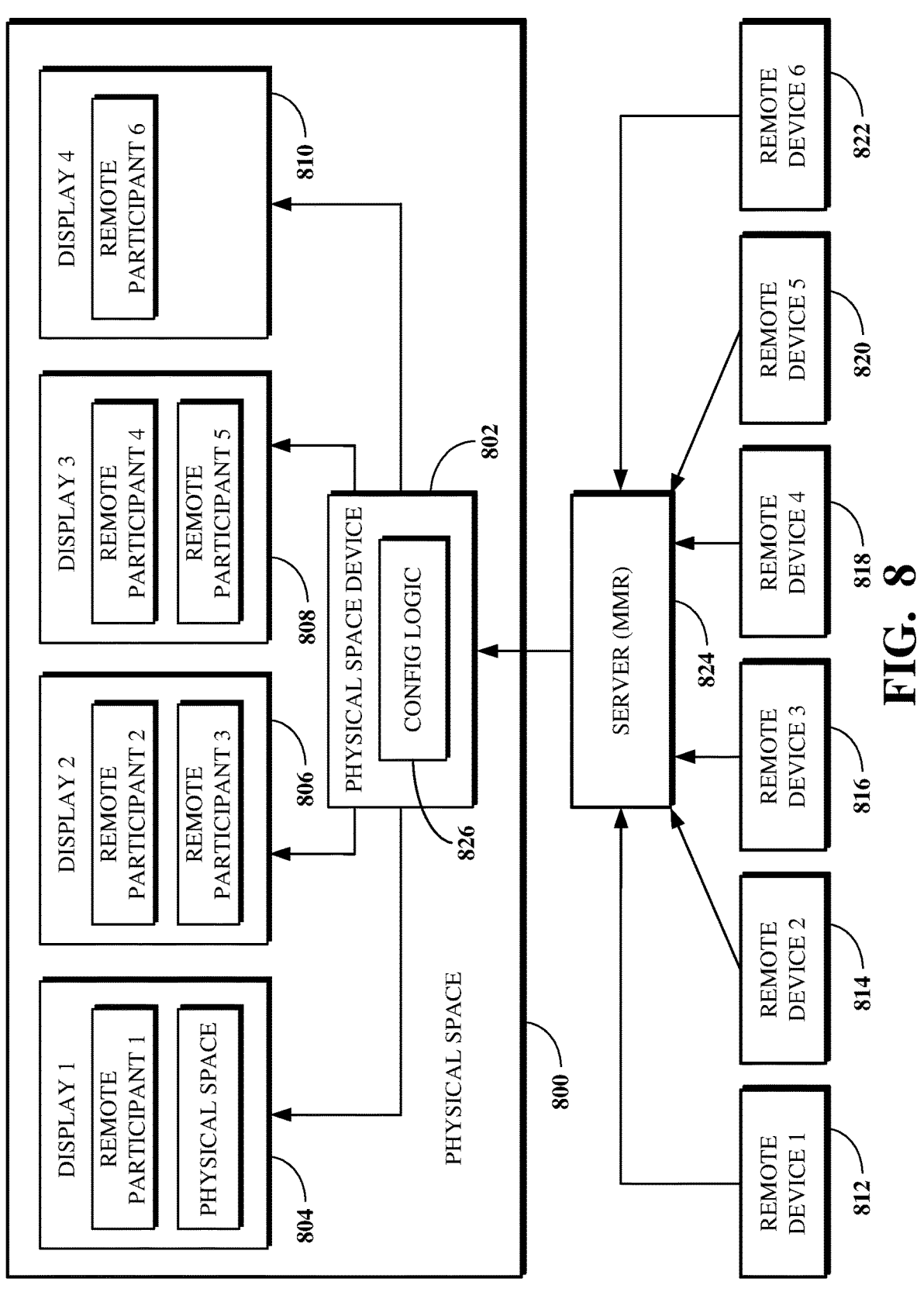
FIG. 8 is a block diagram of an example of a leader-follower approach for assigning select conference participant video streams for output at select displays of a physical space associated with a software-based room system.

Various leader-follower approaches available via leader-follower software (e.g., the leader-follower software 700 shown in FIG. 7) and which may be used in a video conference will now be described with respect to FIGS. 8-14, which show examples of such leader-follower approaches with certain numbers of certain devices shown by example only and without regard to system requirements. FIG. 8 is a block diagram of an example of a leader-follower approach for assigning select conference participant video streams for output at select displays of a physical space 800 associated with a software-based room system. The physical space 800, which may, for example, be the physical space 600 shown in FIG. 6, includes a physical space device 802 and displays 1 804, 2 806, 3 808, and 4 810. The physical space device 802 may, for example, be the physical space device 602 shown in FIG. 6 and the displays 1 804 through 4 810 may, for example, be the displays 1 610 through N 612 shown in FIG. 6. Remote devices 1 812, 2 814, 3 816, 4 818, 5 820, and 6 822 are remote devices external to the physical space 800. The remote devices 1 812 through 6 822 may, for example, be the remote devices 1 516 through N 518 shown in FIG. 5. The physical space device 802 and the remote devices 1 812 through N 822 connect to a video conference implemented via a server 824, which may, for example, be the server 514 shown in FIG. 5. For example, the server 824 may include MMR functionality for connecting devices to and implementing a video conference.

The physical space device 802 is a leader device selected for the video conference, and the displays 1 804 through 4 810 are follower devices authenticated for the video conference. Configuration logic 826 defined for the video conference is asserted to enable the physical space device 802, as the leader device, to control the displays 1 804 through 4 810. In particular, the configuration logic 826 enables the physical space device 802 to control the output of certain conference participant video streams at certain ones of the displays 1 804 through 4 810. The conference participant video streams include video streams obtained from each of the remote devices 1 812 through 6 822 as well as a video stream of the physical space 800 (e.g., captured using one or more cameras of the physical space 800). The control of the output of certain video streams at certain displays may, for example, be based on capabilities of the displays 1 804 through 4 810, such as their resolution, touch interface, and/or video frame refresh capabilities.

In the example shown, the physical space device 802, according to the configuration logic 826, controls the displays 1 804 through 4 810 to cause the video streams for the physical space 800 and the participant using the remote device 1 812 to be output at the display 1 804, the video streams for the participants using the remote devices 2 814 and 3 816 to be output at the display 2 806, the video streams for the participants using the remote devices 4 818 and 5 820 to be output at the display 3 808, and the video stream for the participant using the remote device 6 822 to be output at the display 4 810. In some cases, the physical space device 802 may, according to the configuration logic 826, selectively control the output of the video streams at the displays 1 804 through 4 810 by changing the display at which a given one or more of those video streams is output at some point during the video conference.

Figure 9:
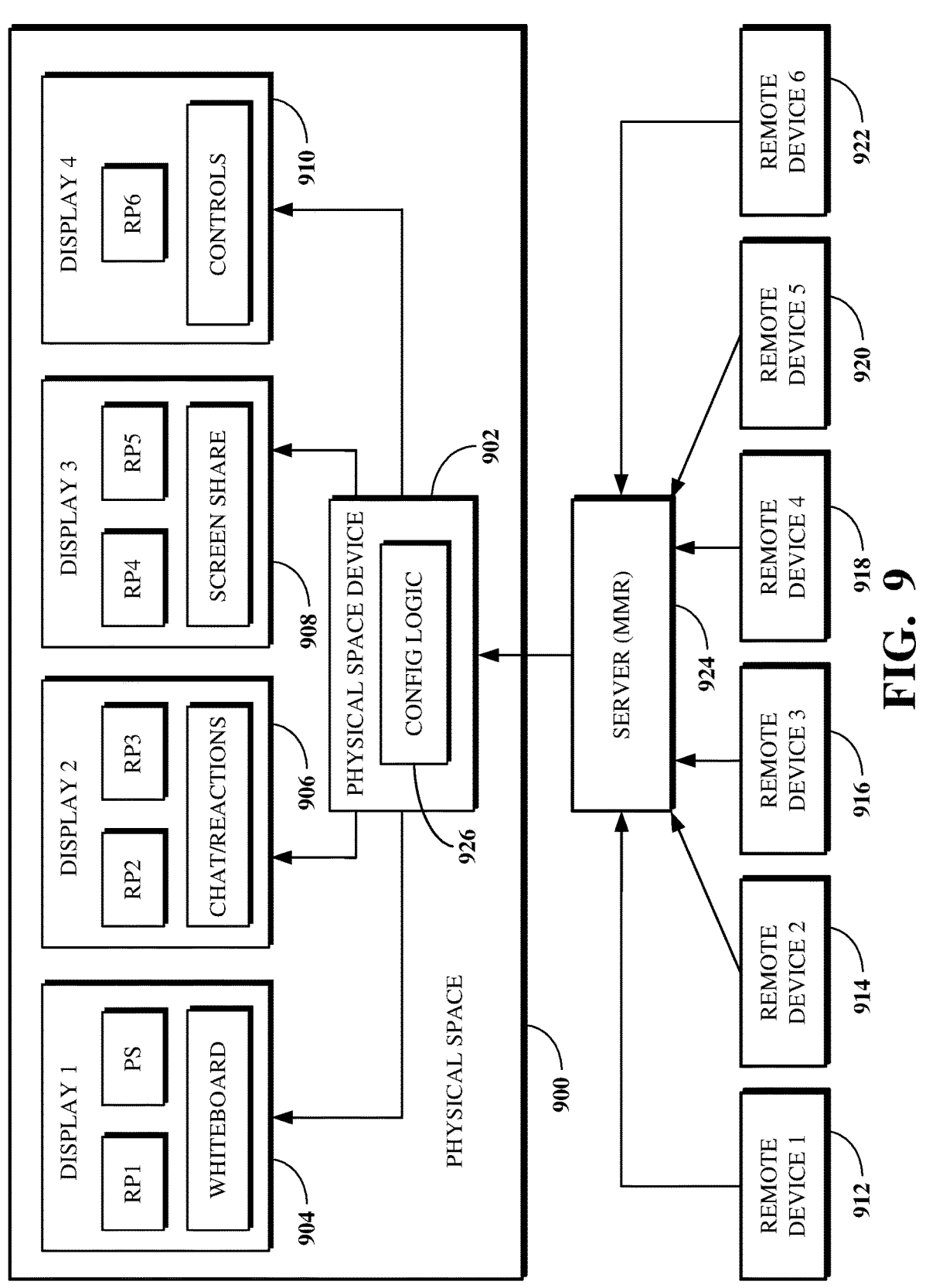
FIG. 9 is a block diagram of an example of a leader-follower approach for assigning select conferencing functionality select displays of a physical space associated with a software-based room system.

FIG. 9 is a block diagram of an example of a leader-follower approach for assigning select conferencing functionality select displays of a physical space 900 associated with a software-based room system. The physical space 900, which may, for example, be the physical space 600 shown in FIG. 6, includes a physical space device 902 and displays 1 904, 2 906, 3 908, and 4 910. The physical space device 902 may, for example, be the physical space device 602 shown in FIG. 6 and the displays 1 904 through 4 910 may, for example, be the displays 1 610 through N 612 shown in FIG. 6. Remote devices 1 912, 2 914, 3 916, 4 918, 5 920, and 6 922 are remote devices external to the physical space 900. The remote devices 1 912 through 6 922 may, for example, be the remote devices 1 516 through N 518 shown in FIG. 5. The physical space device 902 and the remote devices 1 912 through N 922 connect to a video conference implemented via a server 924, which may, for example, be the server 514 shown in FIG. 5. For example, the server 924 may include MMR functionality for connecting devices to and implementing a video conference.

The physical space device 902 is a leader device selected for the video conference, and the displays 1 904 through 4 910 are follower devices authenticated for the video conference. Configuration logic 926 defined for the video conference is asserted to enable the physical space device 902, as the leader device, to control the displays 1 904 through 4 910. In particular, the configuration logic 926 enables the physical space device 902 to control not only the output of certain conference participant video streams at certain ones of the displays 1 904 through 4 910, but also the output of certain video conference functionality at ones of the displays 1 904 through 4 910. Non-limiting examples of such video conference functionality include whiteboard functionality, chat messaging and related (e.g., reaction) functionality, screen share functionality, and functionality available via conference controls. The control of the output of certain video streams and/or video conference functionality at certain displays may, for example, be based on capabilities of the displays 1 904 through 4 910, such as their resolution, touch interface, and/or video frame refresh capabilities.

In the example shown, the physical space device 902, according to the configuration logic 926, controls the displays 1 904 through 4 910 to cause participant video streams to be output at ones of the displays 1 904 through 4 910 similar to as described above with respect to FIG. 8. However, the physical space device 902 also, according to the configuration logic 926, controls the displays 1 904 through 4 910 to cause an output of whiteboard functionality at the device 1 904, an output of chat messaging and related functionality at the device 2 906, an output of screen share functionality at the device 3 908, and an output of functionality available via conference controls (e.g., a user interface including those conference controls, such as host controls for muting, unmuting, recording, disabling recording, and taking similar actions with respect to the video conference) at the device 4 910. In some cases, the physical space device 902 may, according to the configuration logic 926, selectively control the output of the video streams and/or the video conference functionality at the displays 1 904 through 4 910 by changing the display at which a given one or more of those video streams and/or video conference functionalities is output at some point during the video conference.

Figure 10:
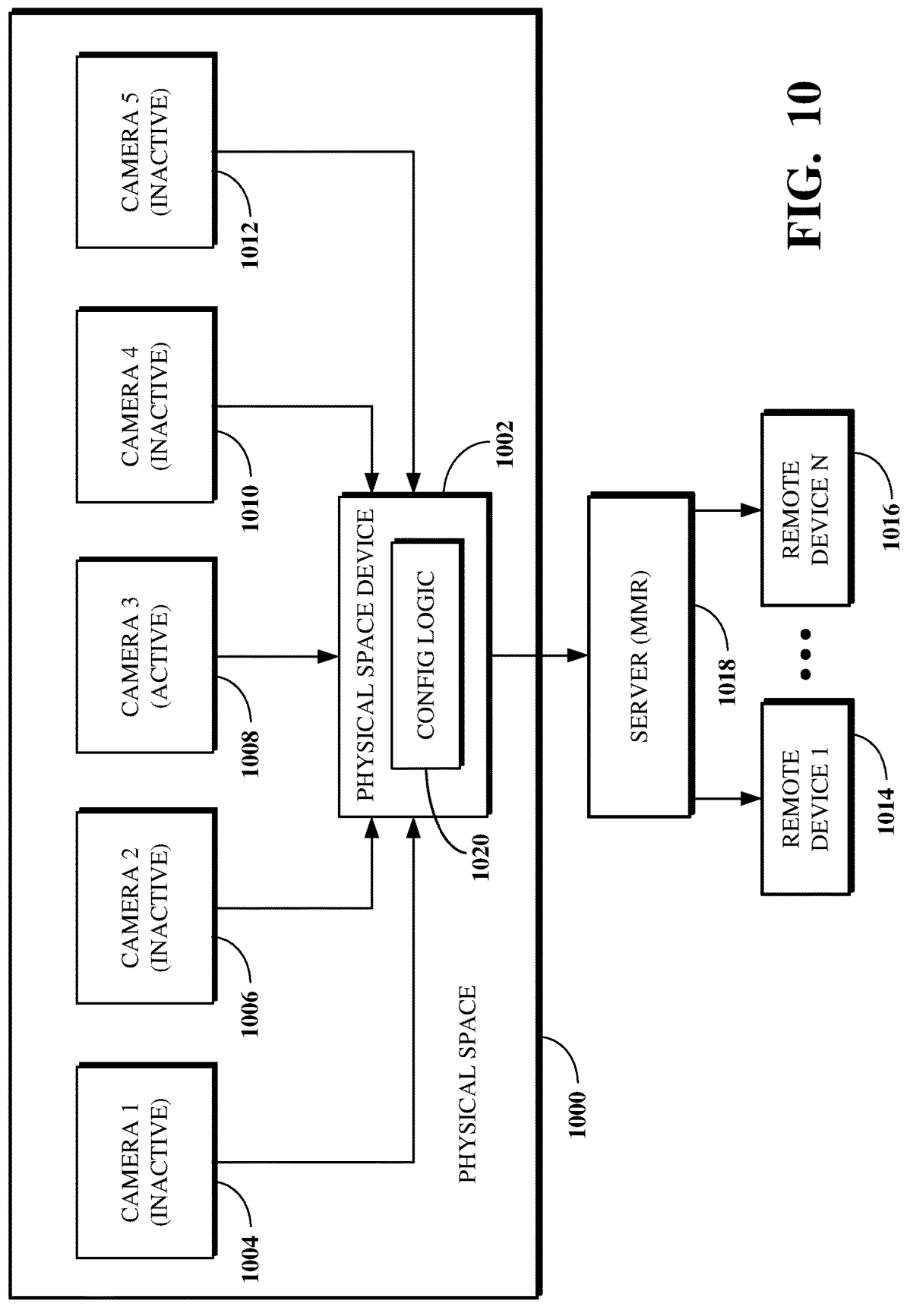
FIG. 10 is a block diagram of an example of a leader-follower approach for selecting and using a single camera of a physical space associated with a software-based room system to transmit a single video stream for the physical space to remote video conference participants.

FIG. 10 is a block diagram of an example of a leader-follower approach for selecting and using a single camera of a physical space 1000 associated with a software-based room system to transmit a single video stream for the physical space 1000 to remote video conference participants. The physical space 1000, which may, for example, be the physical space 600 shown in FIG. 6, includes a physical space device 1002 and cameras 1 1004, 2 1006, 3 1008, 4 1010, and 5 1012. The physical space device 1002 may, for example, be the physical space device 602 shown in FIG. 6 and the cameras 1 1004 through 5 1012 may, for example, be the cameras 1 606 through N 608 shown in FIG. 6. Remote devices 1 1014 through N 1016 are remote devices external to the physical space 1000. The remote devices 1 1014 through N 1016 may, for example, be the remote devices 1 516 through N 518 shown in FIG. 5. The physical space device 1002 and the remote devices 1 1014 through N 1016 connect to a video conference implemented via a server 1018, which may, for example, be the server 514 shown in FIG. 5. For example, the server 1018 may include MMR functionality for connecting devices to and implementing a video conference.

The physical space device 1002 is a leader device selected for the video conference, and the cameras 1 1004 through 5 1012 are follower devices authenticated for the video conference. Configuration logic 1020 defined for the video conference is asserted to enable the physical space device 1002, as the leader device, to control the cameras 1 1004 through 5 1012. In particular, the configuration logic 1020 enables the physical space device 1002 to control the capture of one or more video streams for participants at the physical space 1000 using certain ones of the cameras 1 1004 through 5 1012. The control of the capture of certain video streams using certain cameras may, for example, be based on capabilities of the cameras 1 1004 through 5 1012, such as their resolution, frame rate, and/or multi-stream capabilities. In some cases, more than one camera of the cameras 1 1004 through 5 1012 may be activated and used to capture a video stream to transmit to the physical space device 1002.

In the example shown, the physical space device 1002, according to the configuration logic 1020, controls the cameras 1 1004 through 5 1012 to activate a single one of those cameras at a time and cause that activated camera to transmit a video stream for the physical space 1000 to the server 1018 for the video conference (i.e., as the video stream depicting the conference participants located at the physical space 1000). In some cases, the physical space 1000 may, according to the configuration logic 1020, selectively control the activation and deactivation of the cameras 1 1004 through 5 1012 and thus the capture of a video stream from a specific one of those cameras at some point during the video conference. For example, the physical space device 1002 may automatically (e.g., based on an activated camera becoming unavailable to the physical space device 1002) or manually (e.g., based on user input) deactivate a currently activated one of the cameras 1 1004 through 5 1012 to activate a different one thereof.

Figure 11:
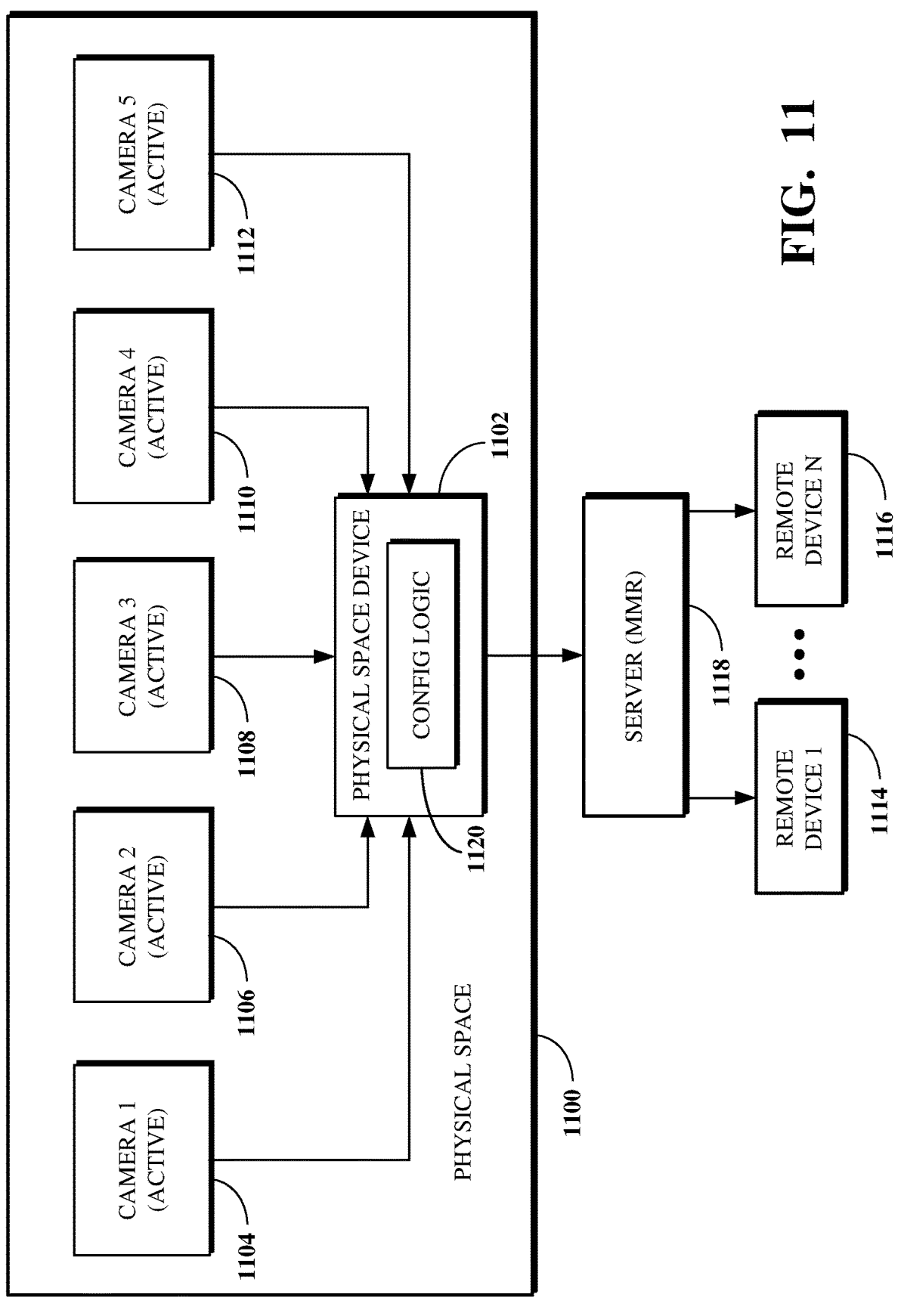
FIG. 11 is a block diagram of an example of a leader-follower approach for selecting and using multiple cameras of a physical space associated with a software-based room system to transmit multiple video streams for the physical space to remote video conference participants.

FIG. 11 is a block diagram of an example of a leader-follower approach for selecting and using multiple cameras of a physical space 1100 associated with a software-based room system to transmit multiple video streams for the physical space 1100 to remote video conference participants. The physical space 1100, which may, for example, be the physical space 600 shown in FIG. 6, includes a physical space device 1102 and cameras 1 1104, 2 1106, 3 1108, 4 1110, and 5 1112. The physical space device 1102 may, for example, be the physical space device 602 shown in FIG. 6 and the cameras 1 1104 through 5 1112 may, for example, be the cameras 1 606 through N 608 shown in FIG. 6. Remote devices 1 1114 through N 1116 are remote devices external to the physical space 1100. The remote devices 1 1114 through N 1116 may, for example, be the remote devices 1 516 through N 518 shown in FIG. 5. The physical space device 1102 and the remote devices 1 1114 through N 1116 connect to a video conference implemented via a server 1118, which may, for example, be the server 514 shown in FIG. 5. For example, the server 1118 may include MMR functionality for connecting devices to and implementing a video conference.

The physical space device 1102 is a leader device selected for the video conference, and the cameras 1 1104 through 5 1112 are follower devices authenticated for the video conference. Configuration logic 1120 defined for the video conference is asserted to enable the physical space device 1102, as the leader device, to control the cameras 1 1104 through 5 1112. In particular, the configuration logic 1120 enables the physical space device 1102 to control the capture of one or more video streams for participants at the physical space 1100 from each of the cameras 1 1104 through 5 1112 at a given time during the video conference.

In the example shown, the cameras 1 1104 through 5 1112 are all activated throughout the video conference, or at least at a given point thereof, and the physical space device 1102, according to the configuration logic 1120, controls the cameras 1 1104 through 5 1112 to cause them to each capture and transmit one or more video streams for the physical space 1100 to the server 1118 for the video conference (i.e., as video streams depicting the conference participants located at the physical space 1100). For example, using this multi-stream leader-follower approach, multiple video streams may simultaneously be used to depict the physical space 1100 within the video conference, in which a given conference participant located within the physical space 1100 may appear in one or more of those multiple video streams.

Figure 12:
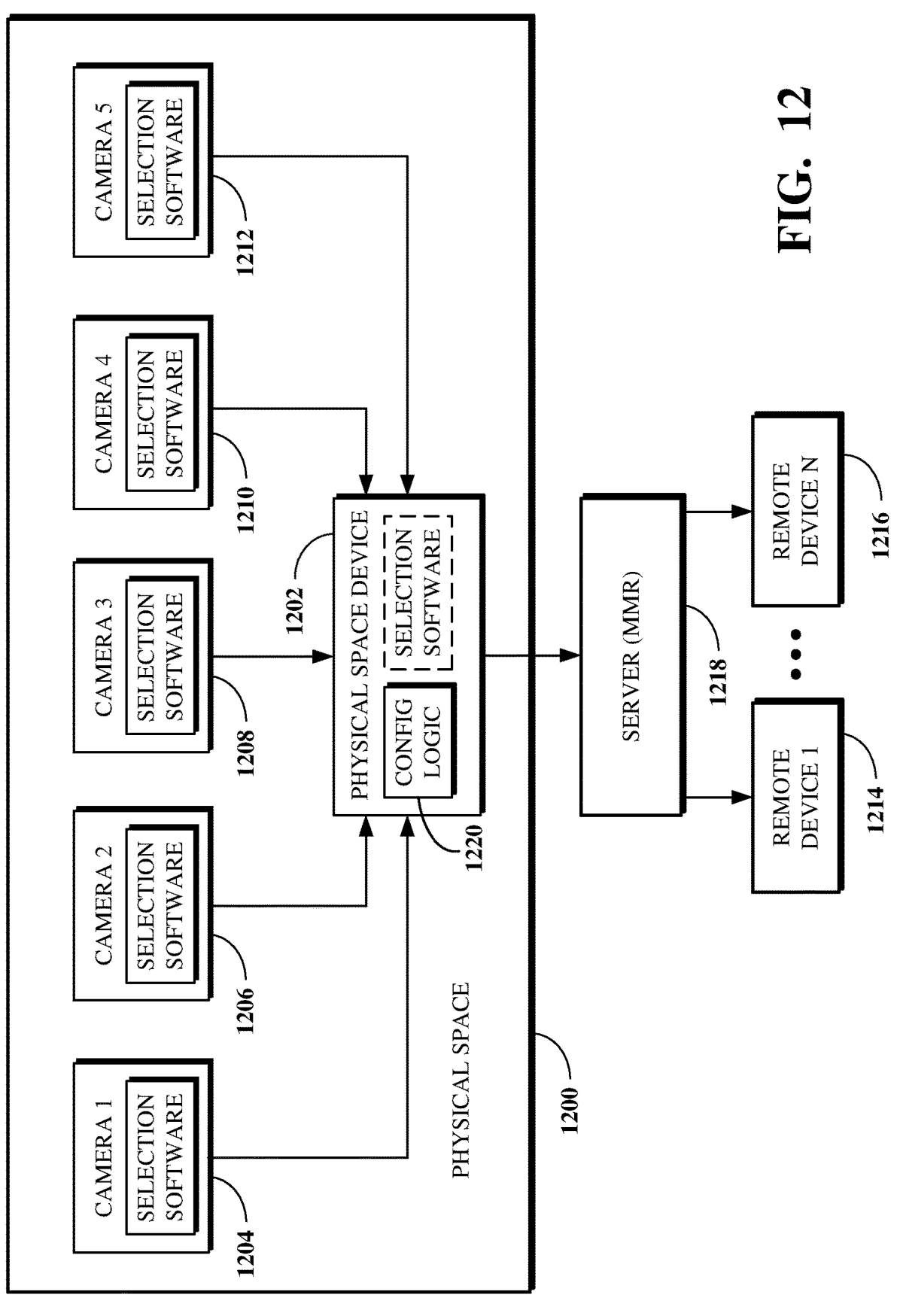
FIG. 12 is a block diagram of an example of a leader-follower approach for using selection software at one or more devices of a physical space associated with a software-based room system to select a video stream to use for one or more conference participants within the physical space.

FIG. 12 is a block diagram of an example of a leader-follower approach for using selection software at one or more devices of a physical space 1200 associated with a software-based room system to select a video stream to use for one or more conference participants within the physical space 1200. The physical space 1200, which may, for example, be the physical space 600 shown in FIG. 6, includes a physical space device 1202 and cameras 1 1204, 2 1206, 3 1208, 4 1210, and 5 1212. The physical space device 1202 may, for example, be the physical space device 602 shown in FIG. 6 and the cameras 1 1204 through 5 1212 may, for example, be the cameras 1 606 through N 608 shown in FIG. 6. Remote devices 1 1214 through N 1216 are remote devices external to the physical space 1200. The remote devices 1 1214 through N 1216 may, for example, be the remote devices 1 516 through N 518 shown in FIG. 5. The physical space device 1202 and the remote devices 1 1214 through N 1216 connect to a video conference implemented via a server 1218, which may, for example, be the server 514 shown in FIG. 5. For example, the server 1218 may include MMR functionality for connecting devices to and implementing a video conference.

The physical space device 1202 is a leader device selected for the video conference, and the cameras 1 1204 through 5 1212 are follower devices authenticated for the video conference. Configuration logic 1220 defined for the video conference is asserted to enable the physical space device 1202, as the leader device, to control the cameras 1 1204 through 5 1212. In particular, the configuration logic 1220 enables the physical space device 1102 to control the capture of one or more video streams for participants at the physical space 1200 from each of the cameras 1 1204 through 5 1212 at a given time during the video conference.

The cameras 1 1204 through 5 1212 each run selection software used to process multiple video streams and/or fields of view usable to capture such video streams to determine a select video stream to capture and transmit to the physical space device 1202 for the video conference. The selection software running at a given camera determines a select video stream for one or more conference participants located at the physical space 1200 from amongst candidate video streams captured by that camera or otherwise based on regions of interest which can be processed within a field of view of that camera. The selection software determines a select video stream for a given one or more conference participants by processing candidate video streams captured at the subject camera running the selection software. A score is determined for each such candidate video stream, and those scores are compared to determine the select video stream from amongst those candidate video streams.

The score for a candidate video stream is determined based on one or more factors according to representations of the conference participant within the video stream. An example list of the factors evaluated to determine a score includes, without limitation, a percentage of a face of the conference participant which is visible within the video stream, a direction of the face of the conference participant relative to the camera from which the video stream is obtained, a direction of an eye gaze of the conference participant relative to the camera, and/or a degree to which the face of the conference participant is obscured within the video stream. In some implementations, a factor of the one or more factors may correspond other than to a conference participant. For example, a factor used to determine a score for a video stream may correspond to a resolution or frame rate at which the video stream is captured or to a resolution or frame rate capability of the camera that captured the video stream.

In some cases, the scores can be determined using a machine learning model trained to evaluate video streams according to one or more such factors. A machine learning model as used herein may be or include one or more of a neural network (e.g., a convolutional neural network, recurrent neural network, or other neural network), decision tree, vector machine, Bayesian network, genetic algorithm, deep learning system separate from a neural network, or other machine learning model.

A region of interest generally refers to an area (e.g., a generally rectangular space) within which one or more conference participants are visible within a field of view of a camera of the cameras 1 1204 through 5 1212 or otherwise within a video stream captured from such a camera. There may be one or more regions of interest within such a field of view or video stream. Such a region of interest be determined in one or more ways. In one example, a region of interest can be determined by processing a video stream captured by a camera to detect a number of people, as conference participants, within the field of view of the camera. A machine learning model trained for object detection, facial recognition, or other segmentation can process the video data of the input video stream to identify humans. For example, the machine learning model can draw bounding boxes around objects detected as having human faces, in which those objects are recognized as the conference participants and remaining video data is representative of background content.

In the example shown, the cameras 1 1204 through 5 1212 are all activated throughout the video conference, or at least at a given point thereof, and the physical space device 1202, according to the configuration logic 1220, controls the cameras 1 1204 through 5 1212 to cause them to each capture and transmit a select video stream for the physical space 1200 to the server 1218 for the video conference (i.e., as a video stream depicting the conference participants located at the physical space 1200). For example, using this multi-stream leader-follower approach, multiple video streams may simultaneously be used to depict the physical space 1200 within the video conference, each from one of the cameras 1 1204 through 5 1212, in which a given conference participant located within the physical space 1200 may appear in one or more of those multiple video streams.

In some implementations, the selection software is pushed to each of the cameras 1 1204 through 5 1212 from the physical space device 1202, the server 1218, or another device associated with a software platform used to facilitate the subject video conference. For example, the selection software may be pushed to (e.g., deployed to and/or installed at) the cameras 1 1204 through 5 1212 based on a first activation of those cameras (e.g., in response to those cameras first being identified by the software platform, such as based on a first successful connection and/or driver installation of those cameras at the physical space device 1202). In some implementations, the physical space device 1202 may run such selection software in addition to or in place of the cameras 1 1204 through 5 1212 running such selection software.

Figure 13:
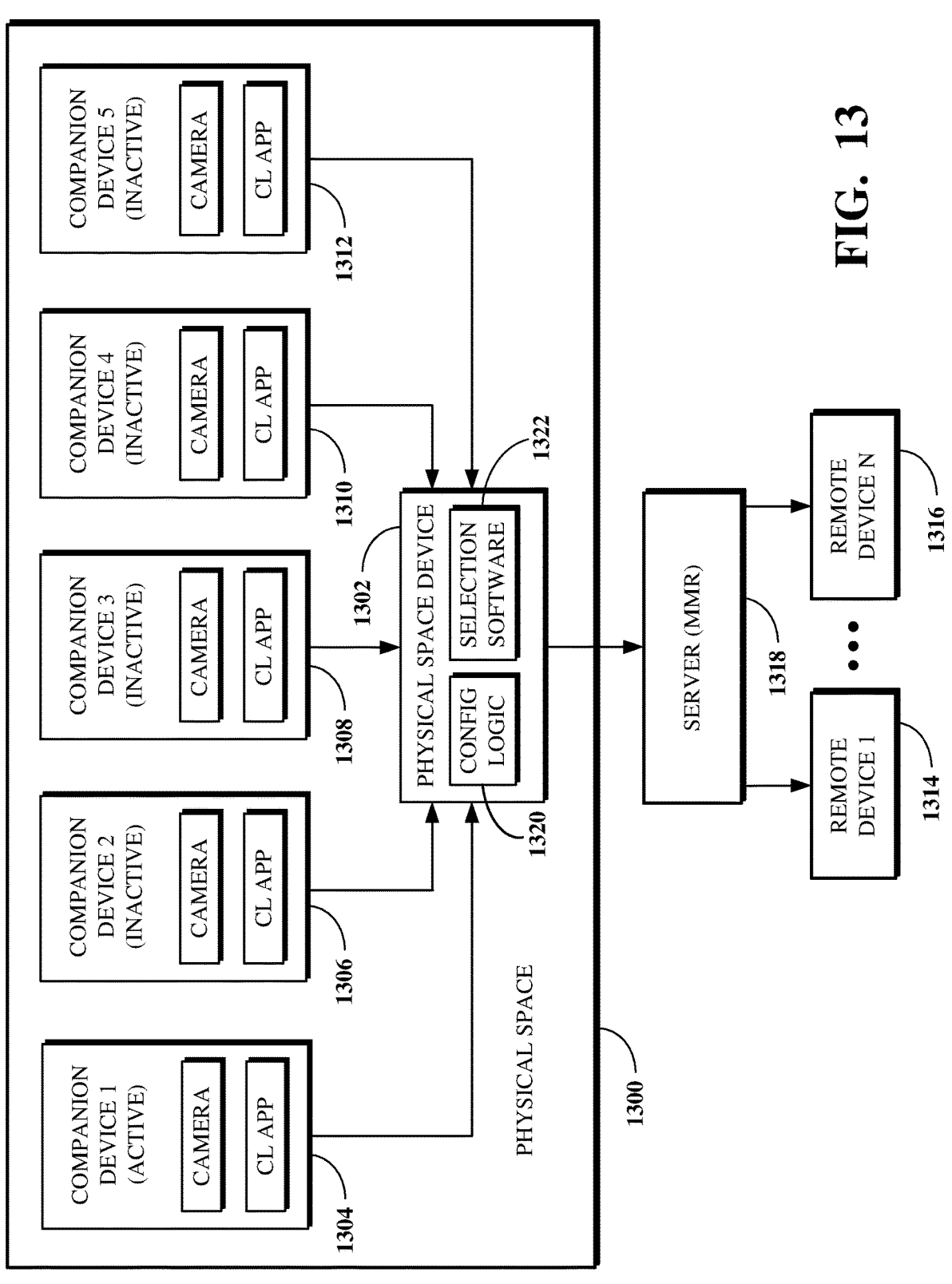
FIG. 13 is a block diagram of an example of a leader-follower approach for activating and using individual companion devices of a physical space associated with a software-based room system with a video conference.

FIG. 13 is a block diagram of an example of a leader-follower approach for activating and using individual companion devices of a physical space 1300 associated with a software-based room system with a video conference. The physical space 1300, which may, for example, be the physical space 600 shown in FIG. 6, includes a physical space device 1302 and companion devices 1 1304, 2 1306, 3 1308, 4 1310, and 5 1312. The physical space device 1302 may, for example, be the physical space device 602 shown in FIG. 6 and the companion devices 1 1304 through 5 1312 may, for example, be the companion devices 1 614 through N 616 shown in FIG. 6. Remote devices 1 1314 through N 1316 are remote devices external to the physical space 1300. The remote devices 1 1314 through N 1316 may, for example, be the remote devices 1 516 through N 518 shown in FIG. 5. The physical space device 1302 and the remote devices 1 1314 through N 1316 connect to a video conference implemented via a server 1318, which may, for example, be the server 514 shown in FIG. 5. For example, the server 1318 may include MMR functionality for connecting devices to and implementing a video conference.

The physical space device 1302 is a leader device selected for the video conference, and the companion devices 1 1304 through 5 1312 are follower devices authenticated for the video conference. Configuration logic 1320 defined for the video conference is asserted to enable the physical space device 1302, as the leader device, to control the companion devices 1 1304 through 5 1312. In particular, the configuration logic 1320 enables the physical space device 1302 to control the activation, deactivation, and use of one or more of the companion devices 1 1304 through 5 1312 at various times during the video conference. In particular, the physical space device 1302, using selection software 1322, can selectively activate, deactivate, and/or control a use of a companion device of the companion devices 1 1304 through 5 1312 to enable a user of the companion device to use the companion device as a personal conferencing device during the video conference, to enable a camera of the companion device to capture a video stream to transmit to the physical space device 1302 to represent the physical space within the video conference (i.e., as an additional camera within the physical space), to access various functionality of the video conference (e.g., screen share materials, whiteboards, or the like) using a client application running at the companion device and connecting the companion device to the video conference, or the like. In some cases, the camera of a companion device of the companion devices 1 1304 through 5 1312 may be used to capture a candidate video stream processed by selection software to determine a select video stream for one or more conference participants at the physical space 1300, as described above with respect to FIG. 12.

In the example shown, the companion device 1 1304 is active and the companion devices 2 1306 through 5 1306 are all inactive at a given point during the video conference. For example, the physical space device 1304 may have activated the companion device 1 1304 based on a detection of a person within a field of view of the camera of the companion device 1 1304 for more than a threshold duration. In another example, the physical space device 1304 may have activated the companion device 1 1304 based on user input obtained during the video conference. In yet another example, the companion device 1 may have become activated based on a user thereof powering it on or otherwise engaging it for use during the video conference, independent of control instructions from the physical space device 1302. The camera of the companion device 1 1304 captures a video stream of the user thereof, as a conference participant, and transmits it to the physical space device 1302 for the physical space device 1302 to relay it to the server 1318. In some cases, however, the companion device 1 1304, via the client application running thereat, may transmit the video stream captured using its camera to the server 1318 without relaying the video stream through the physical space device 1302 as an intermediary. While a single companion device is shown as active, in some cases, multiple companion devices can be active at a given time.

Figure 14:
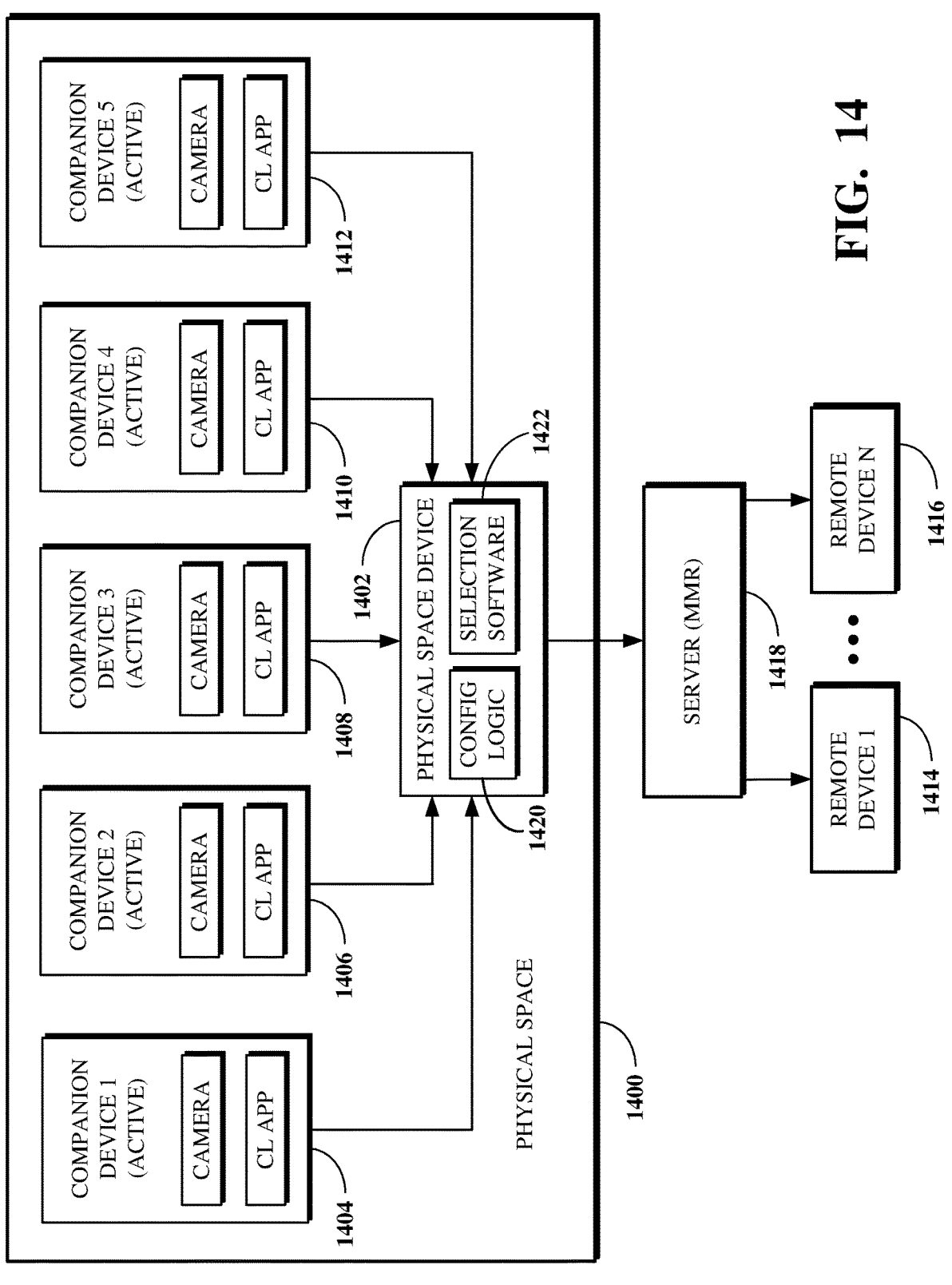
FIG. 14 is a block diagram of an example of a leader-follower approach for activating and using all companion devices of a physical space associated with a software-based room system with a video conference.

FIG. 14 is a block diagram of an example of a leader-follower approach for activating and using all companion devices of a physical space 1400 associated with a software-based room system with a video conference. The physical space 1400, which may, for example, be the physical space 600 shown in FIG. 6, includes a physical space device 1402 and companion devices 1 1404, 2 1406, 3 1408, 4 1410, and 5 1412. The physical space device 1402 may, for example, be the physical space device 602 shown in FIG. 6 and the companion devices 1 1404 through 5 1412 may, for example, be the companion devices 1 614 through N 616 shown in FIG. 6. Remote devices 1 1414 through N 1416 are remote devices external to the physical space 1400. The remote devices 1 1114 through 6 1116 may, for example, be the remote devices 1 516 through N 518 shown in FIG. 5. The physical space device 1102 and the remote devices 1 1114 through N 1116 connect to a video conference implemented via a server 1118, which may, for example, be the server 514 shown in FIG. 5. For example, the server 1118 may include MMR functionality for connecting devices to and implementing a video conference.

The physical space device 1402 is a leader device selected for the video conference, and the companion devices 1 1404 through 5 1412 are follower devices authenticated for the video conference. Configuration logic 1420 defined for the video conference is asserted to enable the physical space device 1402, as the leader device, to control the companion devices 1 1404 through 5 1412. In particular, the configuration logic 1420 enables the physical space device 1402 to control the activation, deactivation, and use of one or more of the companion devices 1 1404 through 5 1412 at various times during the video conference. In particular, the physical space device 1402, using selection software 1422, can selectively control a use of a companion device of the companion devices 1 1404 through 5 1412 to enable a user of the companion device to use the companion device as a personal conferencing device during the video conference, to enable a camera of the companion device to capture a video stream to transmit to the physical space device 1302 to represent the physical space within the video conference (i.e., as an additional camera within the physical space), to access various functionality of the video conference (e.g., screen share materials, whiteboards, or the like) using a client application running at the companion device and connecting the companion device to the video conference, or the like. In some cases, the camera of a companion device of the companion devices 1 1404 through 5 1412 may be used to capture a candidate video stream processed by selection software to determine a select video stream for one or more conference participants at the physical space 1400, as described above with respect to FIG. 12.

In the example shown, the companion devices 1 1404 through 5 1412 are all active during the video conference. For example, the companion devices 1 1404 through 5 1412 may, according to the configuration logic, be set to remain active throughout the video conference to enable the cameras thereof to capture video streams which may be processed (e.g., as candidate video streams, as described above with respect to FIG. 12, or otherwise) for the video conference and to enable the companion devices to remain available to use functionality of the video conference. For example, the companion devices 1 1404 through 5 1412 may each be digital whiteboarding devices which are permanently or removably located in the physical space 1400 for use during the video conference. Users thereof may approach the companion devices 1 1404 through 5 1412 to manipulate, view, or otherwise interact with different digital whiteboards, digital whiteboard layers, or digital whiteboard content throughout the video conference. The various user interactions therewith may be transmitted to the server 1419 via the client applications running at the companion devices 1404 through 5 1412 (e.g., via the physical space device 1402 as an intermediary or otherwise).

Figures 15A, 15B:
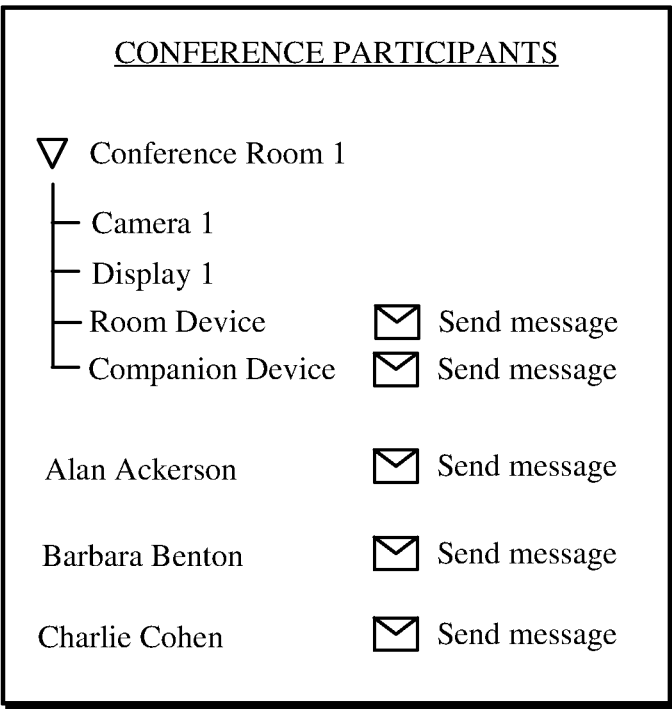
FIG. 15A is an illustration of a conference participant list in which individual components of a physical space associated with a software-based room system are represented as separate logical entities.
FIG. 15B is an illustration of a conference participant list in which all components of a physical space associated with a software-based room system are collectively represented as a single logical entity.

FIG. 15A is an illustration of a conference participant list in which individual components of a physical space (e.g., the physical space 600 shown in FIG. 6) associated with a software-based room system (e.g., the system 500 shown in FIG. 5) are represented as separate logical entities. As shown, the conference participant list includes the participants Conference Room 1, Alan Ackerson, Barbara Benton, and Charlie Cohen, in which the latter three are remote participants not located at the physical space and Conference Room 1 represents all of the in-person participants who are located at the physical space. The Conference Room 1 participant is nested to show the individual components, treated as their own individual conference participants, which include Camera 1, Display 1, Room Device, and Companion Device. Conference Room 1, Camera 1, Display 1, Room Device, and Companion Device are represented as separate logical entities.

FIG. 15B is an illustration of a conference participant list in which all components of a physical space associated with a software-based room system are collectively represented as a single logical entity. The conference participant list shown in FIG. 15B corresponds to the conference participant list shown in FIG. 15A; however, instead of individual components of the Conference Room 1 participant being nested thereunder, Conference Room 1 is shown to represent all of the applicable components as a single logical entity.

To further describe some implementations in greater detail, reference is next made to examples of techniques which may be performed by or using a leader-follower system for video conferencing.

Figure 16:
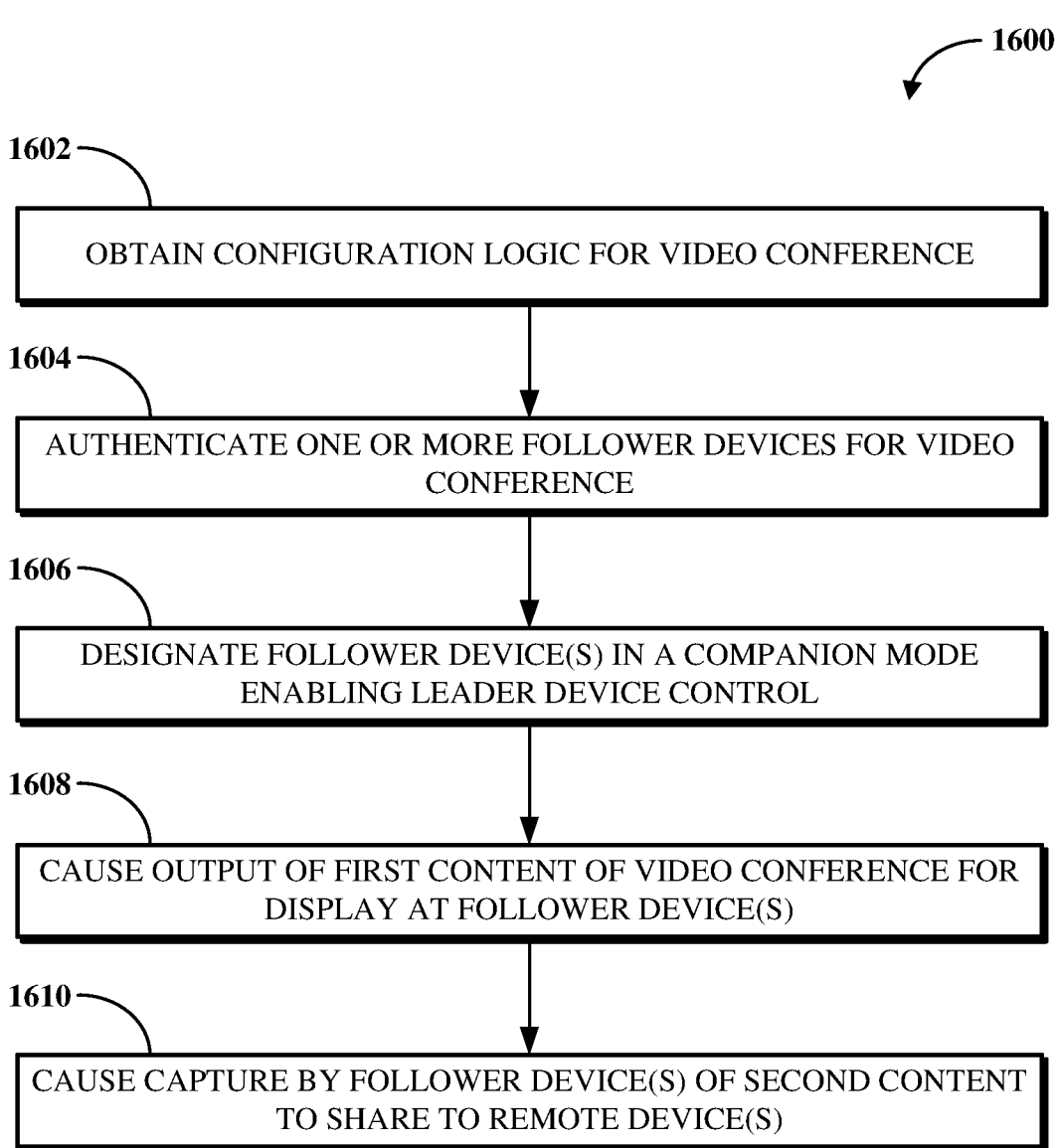
FIG. 16 is a flowchart of an example of a technique for controlling follower devices in a companion mode designation during a video conference.
Figure 17:
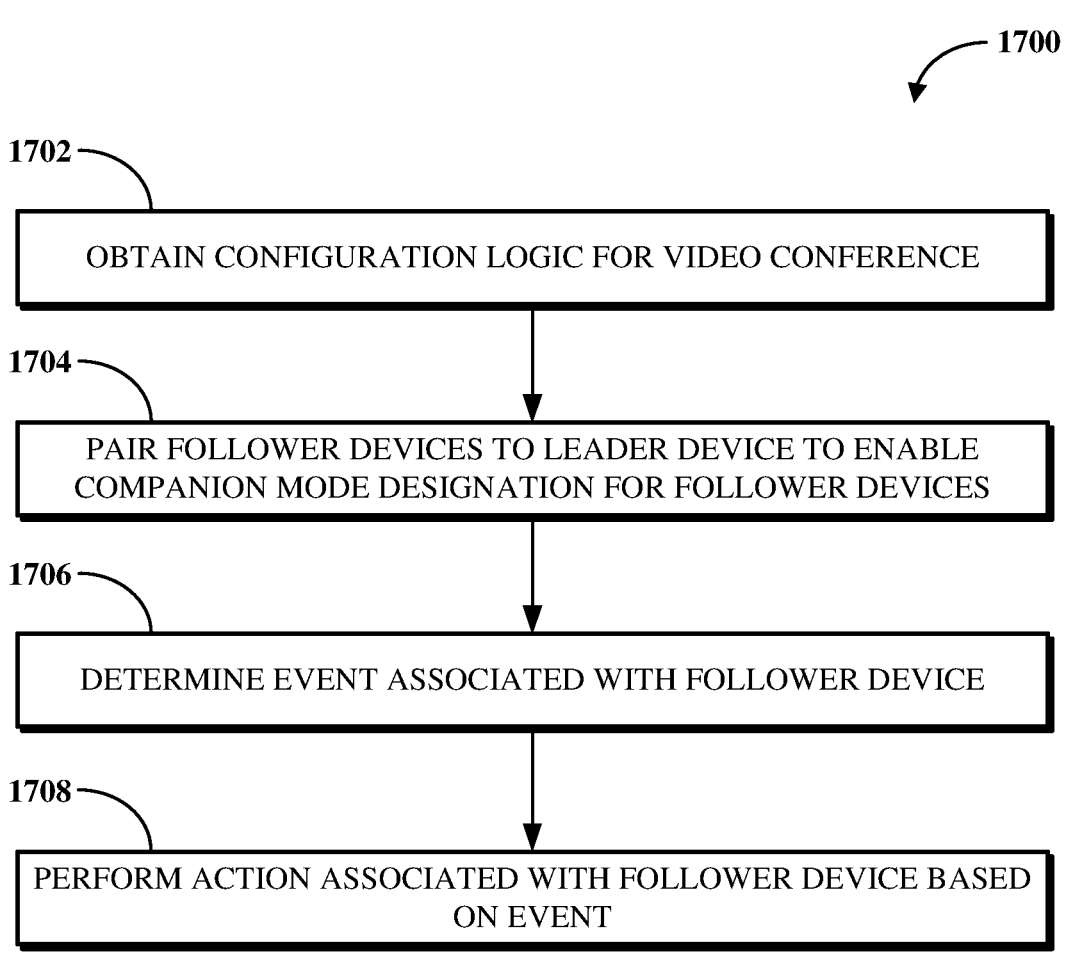
FIG. 17 is a flowchart of an example of a technique for automatically activating and/or deactivating follower devices during a video conference.
Figure 19:
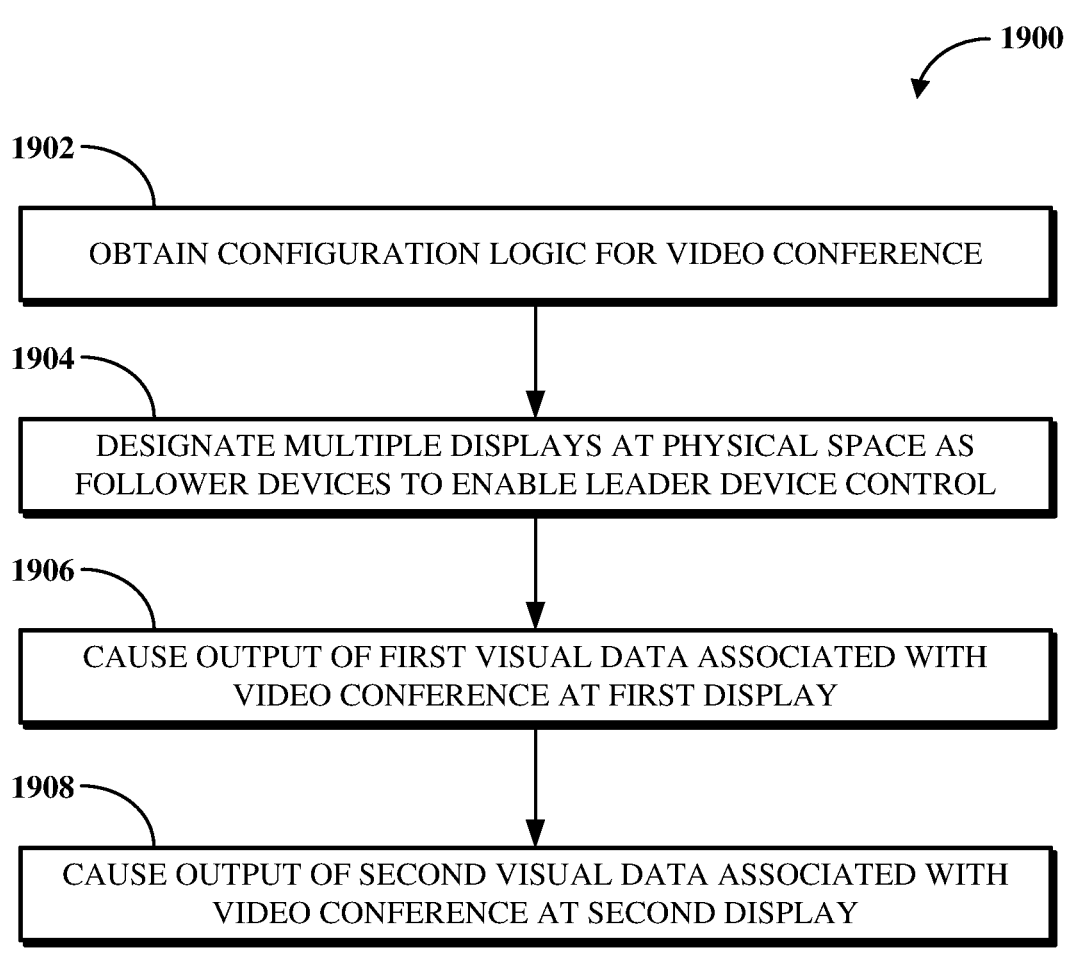
FIG. 19 is a flowchart of an example of a technique for selectively controlling the output to display at a follower device during a video conference.
Figure 20:
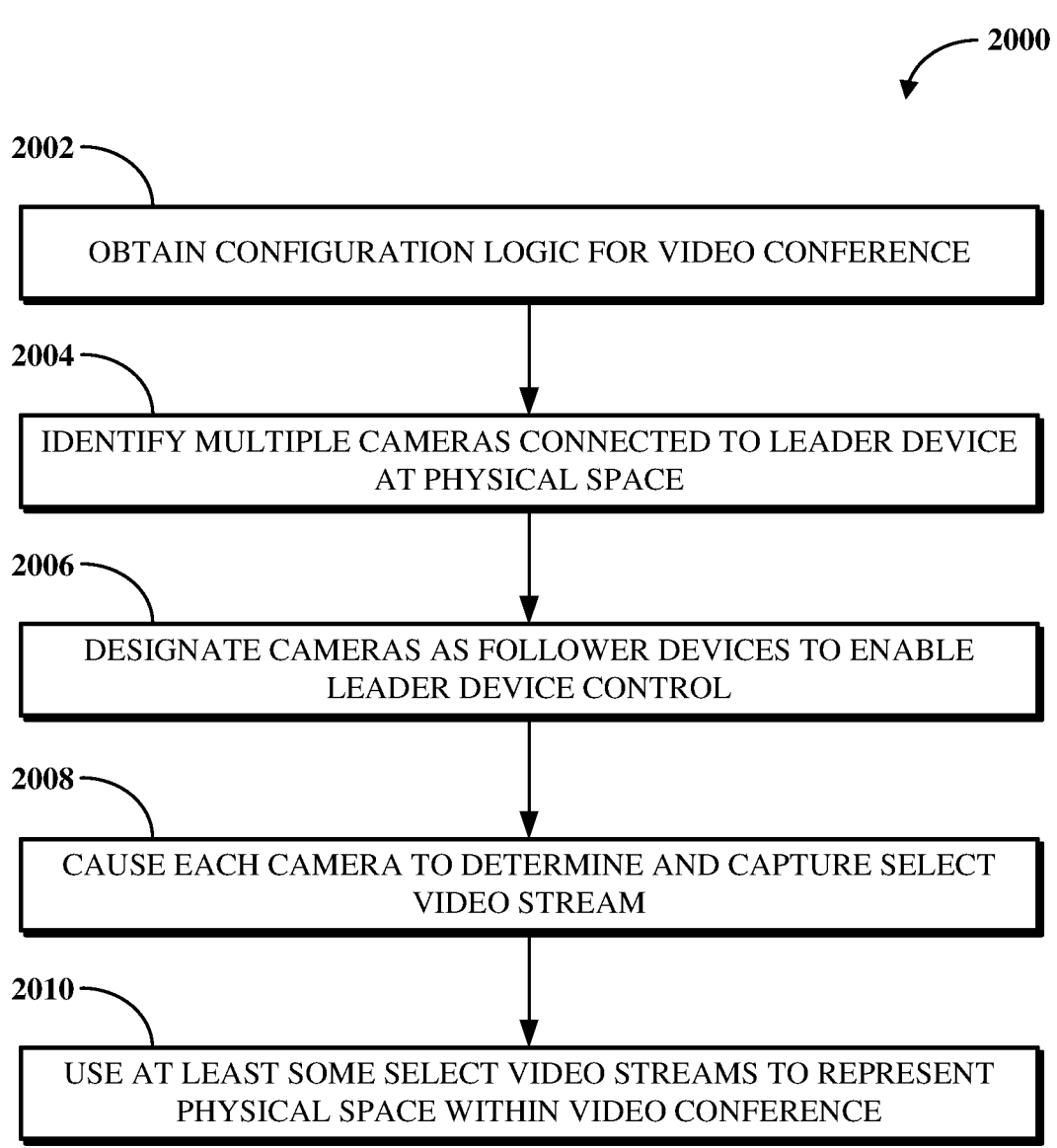
FIG. 20 is a flowchart of an example of a technique for controlling the capture of video streams at follower devices during a video conference.

FIG. 16 is a flowchart of an example of a technique 1600 for controlling follower devices in a companion mode designation during a video conference. FIG. 17 is a flowchart of an example of a technique 1700 for automatically activating and/or deactivating follower devices during a video conference. FIG. 18 is a flowchart of an example of a technique 1800 for authenticating a follower device for leader device control during a video conference. FIG. 19 is a flowchart of an example of a technique 1900 for selectively controlling the output to display at a follower device during a video conference. FIG. 20 is a flowchart of an example of a technique 2000 for controlling the capture of video streams at follower devices during a video conference.

The techniques 1600, 1700, 1800, 1900, and 2000 can be executed using computing devices, such as the systems, hardware, and software described with respect to FIGS. 1-14. The techniques 1600, 1700, 1800, 1900, and 2000 can be performed, for example, by executing a machine-readable program or other computer-executable instructions, such as routines, instructions, programs, or other code. The steps, or operations, of the techniques 1600, 1700, 1800, 1900, and 2000, or another technique, method, process, or algorithm described in connection with the implementations disclosed herein can be implemented directly in hardware, firmware, software executed by hardware, circuitry, or a combination thereof.

For simplicity of explanation, the techniques 1600, 1700, 1800, 1900, and 2000 are each depicted and described herein as a series of steps or operations. However, the steps or operations of the technique 1600, 1700, 1800, 1900, and 2000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 16, at 1602, configuration logic is obtained for a video conference which some participants will attend from a physical space. Based on the configuration logic, a leader device of the physical space is selected. At 1604, based on the configuration logic, one or more follower devices are authenticated for the video conference. The one or more follower devices include personal computing devices which can be designated in a companion mode for the video conference. Authenticating the one or more follower devices may, for example, include pairing the one or more follower devices to the leader device (e.g., prior to the one or more follower devices connecting to the video conference or thereafter).

At 1606, the one or more follower devices are designated in the companion mode in which the leader device maintains control over each of the one or more follower devices for the video conference. The designation may, for example, be based on the configuration logic. The control maintained by the leader device may, for example, be limited to certain functionality of the video conference (e.g., digital whiteboarding) and/or certain components of the follower devices (e.g., cameras and displays thereof). In some cases, the companion mode designation is based on the leader device and the one or more follower devices each connecting to the video conference. For example, the companion mode designation of the one or more follower devices may be based on a determination that a same participant account is used to connect the leader device and each of the one or more follower devices to the video conference. The video conference may, for example, be initiated based on input received from the leader device or a follower device of the one or more follower devices.

At 1608, based on the companion mode designation of the one or more follower devices, each of the one or more follower devices is caused to output first content of the video conference for display. At 1610, based on the companion mode designation of the one or more follower devices, each of the one or more follower devices is caused to capture second content to share to one or more remote conference devices connected to the video conference. For example, the first content corresponds to a digital whiteboard and the second content corresponds to content to add to the digital whiteboard. In another example, the first content corresponds to video content of one or more of the remote conference participants and the second content corresponds to a video stream of the conference participant using a given follower device.

Referring next to FIG. 17, at 1702, configuration logic is obtained for a video conference which some participants will attend from a physical space. Based on the configuration logic, a leader device of the physical space is selected. At 1704, follower devices within the physical space are paired to the leader device to enable a companion mode designation for the follower devices during a video conference. For example, the follower devices may be paired to the leader device based on the configuration logic.

At 1706, an event associated with a follower device designated in the companion mode is determined. The event may, for example, be determined based on a connection of the leader device to the video conference and based on the pairing between the leader device and the follower device. For example, the event may correspond to a determination that a state of the follower device changed from not in-use to in-use. In such a case, determining the event may include detecting a conference participant within a field of view of a camera of the follower device for more than a threshold period of time. In another example, the event may correspond to a determination that a state of the follower device changed from in-use to not in-use. Other examples of the event are possible. In such a case, determining the event may include failing to detect for more than a threshold period of time, within a field of view of a camera of the follower device, a conference participant previously within the field of view.

At 1708, based on the event and the companion mode designation for the follower device, an action associated with the follower device is performed. For example, performing the action may include automatically initiating a connection of the follower device to the video conference based on the determination that the state of the follower device changed from not in-use to in-use. In another example, performing the action may include automatically terminating a connection of the follower device to the video conference based on the determination that the state of the follower device changed from in-use to not in-use.

Referring next to FIG. 18, at 1802, configuration logic is obtained for a video conference which some participants will attend from a physical space. Based on the configuration logic, a leader device of the physical space is selected. At 1804, a follower device within the physical space is paired to the leader device to enable a companion mode designation for the follower device during a video conference. For example, the follower device may be paired to the leader device based on the configuration logic.

At 1806, based on a connection of the leader device to the video conference, the follower device is caused to connect to the video conference according to the companion mode designation. For example, causing the follower device to connect to the video conference may include the leader device causing the follower device to initiate a connection to the video conference via a client application running at the follower device. In some such cases, the leader device may cause the follower device to initiate the connection using a same participant account used with the leader device.

At 1808, name information identifying a conference participant is obtained using the follower device. Obtaining the name information may, for example, include one or more of obtaining text input from a user of the follower device or a user of the leader device, or capturing an image using a camera of the follower device. At 1810, a representation of the follower device within the video conference is updated to indicate the name information. For example, a name or other identifier indicated within a user interface tile corresponding to the follower device may be changed to instead indicate the name information.

Referring next to FIG. 19, at 1902, configuration logic is obtained for a video conference which some participants will attend from a physical space. Based on the configuration logic, a leader device of the physical space is selected. At 1904, multiple displays at the physical space are designated as follower devices to enable the leader device to control the displays during a video conference. In some implementations, the technique 1900 can include authenticating the multiple displays for the video conference based on connections of the multiple displays to the leader device.

At 1906, a configuration (e.g., based on the configuration logic or derived as a signal transmitted from the leader device) is enforced to cause, during the video conference, an output of first visual data associated with the video conference at a first display of the multiple displays. At 1908, a configuration (e.g., based on the configuration logic or derived as a signal transmitted from the leader device) is enforced to cause, during the video conference, an output of second visual data associated with the video conference at a second display of the multiple displays. The configuration enforced in 1906 and 1908 may be the same or a different configuration. In some cases, the first visual data corresponds to one or more first conference participant video streams and the second visual data corresponds to one or more second conference participant video streams. In some cases, the first visual data corresponds to first video conference functionality and the second visual data corresponds to second video conference functionality. In some cases, the first visual data corresponds to one or more conference participant video streams and the second visual data corresponds to functionality of the video conference.

Referring last to FIG. 20, at 2002, configuration logic is obtained for a video conference which some participants will attend from a physical space. Based on the configuration logic, a leader device of the physical space is selected. At 2004, multiple cameras located at the physical space and connected to the leader device within the physical space are identified. For example, identifying the multiple cameras can include determining that the multiple cameras are available for the leader device to use with the video conference, such as based on pairings, connections, or other authentications of the cameras.

At 2006, the multiple cameras are designated as follower devices for the video conference based on the configuration logic, in which the follower device designation enables the leader device to control the follower devices during the video conference. At 2008, based on the follower device designations, each camera of the multiple cameras is caused to determine and capture a select video stream depicting one or more conference participants within the physical space. For example, causing each camera to determine and capture the select video streams may include transmitting, from the leader device, a signal to a camera of the multiple cameras to use selection software at the camera to select the select video stream from amongst a plurality of candidate video streams. In some cases, the selection software may be pushed to the cameras prior to or during the video conference. At 2020, at least some of the select video streams are used to represent the physical space within the video conference. For example, each of the at least some of the select video streams may be depicted within its own user interface tile of the video conference.

In some implementations, one or more of the techniques 1600, 1700, 1800, 1900, or 2000 may include defining the configuration logic used for the video conference. In some implementations, one or more of the techniques 1600, 1700, 1800, 1900, or 2000 may include revoking or persisting designations for some or all of the follower devices based on an end of the subject video conference. For example, the companion mode designation of one or more follower devices may be revoked at an end of the video conference. In another example, the companion mode designation of one or more follower devices may persist beyond an end of the video conference.

The techniques 1600, 1700, 1800, 1900, and 2000 describe examples of techniques which may be performed using the systems described with respect to FIGS. 1-14. Thus, other techniques may also be performed using those systems according to this disclosure. While the techniques 1600, 1700, 1800, 1900, and 2000 are separately described, some or all operations thereof may be combined and used together for a single video conference. With each of the techniques 1600, 1700, 1800, 1900, and 2000, the leader device and the applicable follower devices are collectively represented as a single logical entity within the subject video conference.

The implementations of this disclosure describe methods, systems, devices, apparatuses, and non-transitory computer readable media for collectively representing hardware and software components within a physical space used with a software-based room system as a single logical entity in connection with leader-follower approaches for controlling and using those components for video conferencing. In some implementations, a method comprises, a non-transitory computer readable medium stores instructions operable to cause one or more processors to perform operations comprising, and/or a system comprises a memory subsystem storing instructions and processing circuitry configured to execute the instructions for: designating, based on a leader device and one or more follower devices within a physical space each connected to a video conference, the one or more follower devices in a companion mode in which the leader device maintains control over each of the one or more follower devices for the video conference; and at each of the one or more follower devices, based on the companion mode designation for the follower device: causing an output of first content of the video conference for display; and causing a capture of second content to share to one or more remote conference devices connected to the video conference.

In some implementations of the method, the non-transitory computer readable medium, and/or the system, designating the one or more follower devices in the companion mode comprises: determining that a same participant account is used to connect the leader device and each of the one or more follower devices to the video conference.

In some implementations of the method, the non-transitory computer readable medium, and/or the system, the method comprises, the operations comprise, and/or the processing circuitry is configured to execute the instructions for: pairing the one or more follower devices to the leader device prior to the one or more follower devices connecting to the video conference.

In some implementations of the method, the non-transitory computer readable medium, and/or the system, the method comprises, the operations comprise, and/or the processing circuitry is configured to execute the instructions for: initiating the video conference based on input received from a follower device of the one or more follower devices.

In some implementations of the method, the non-transitory computer readable medium, and/or the system, the second content is a video stream.

In some implementations of the method, the non-transitory computer readable medium, and/or the system, the first content corresponds to a digital whiteboard and the second content corresponds to input usable to add content to the digital whiteboard.

In some implementations of the method, the non-transitory computer readable medium, and/or the system, configuration logic defines functionality of the video conference to prevent access to at the one or more follower devices.

In some implementations of the method, the non-transitory computer readable medium, and/or the system, the one or more follower devices are one or both of laptop computers or tablet computers at fixed locations within the physical space.

In some implementations of the method, the non-transitory computer readable medium, and/or the system, the one or more follower devices are digital whiteboard devices configured for movement into and out of the physical space.

In some implementations of the method, the non-transitory computer readable medium, and/or the system, the one or more follower devices are designated in the companion mode based on a determination that a same participant account is used to connect the leader device and each of the one or more follower devices to the video conference.

In some implementations of the method, the non-transitory computer readable medium, and/or the system, the leader device is identified based on configuration logic defined for the video conference.

In some implementations of the method, the non-transitory computer readable medium, and/or the system, the first content corresponds to video conference functionality selected for output at the one or more follower devices.

In some implementations of the method, the non-transitory computer readable medium, and/or the system, the second content corresponds to one or both of a video stream or whiteboard data.

In some implementations of the method, the non-transitory computer readable medium, and/or the system, the one or more follower devices are designated in the companion mode according to configuration logic defined for the video conference.

In some implementations of the method, the non-transitory computer readable medium, and/or the system, the method comprises, the operations comprise, and/or the processing circuitry is configured to execute the instructions for: authenticating the one or more follower devices for the video conference.

In some implementations of the method, the non-transitory computer readable medium, and/or the system, the one or more follower devices connect to the video conference using a same account as the leader device uses to connect to the video conference.

In some implementations of the method, the non-transitory computer readable medium, and/or the system, the second content captured at a follower device of the one or more follower devices is captured using a camera of the follower device.

In some implementations of the method, the non-transitory computer readable medium, and/or the system, the companion mode designation of the one or more follower devices is revoked at an end of the video conference.

In some implementations, a method comprises, a non-transitory computer readable medium stores instructions operable to cause one or more processors to perform operations comprising, and/or a system comprises a memory subsystem storing instructions and processing circuitry configured to execute the instructions for: pairing a follower device within a physical space to a leader device within the physical space to enable a companion mode designation for the follower device during a video conference; determining, based on a connection of the leader device to the video conference and based on the pairing, an event associated with the follower device; and performing, based on the event and the companion mode designation of the follower device, an action associated with the follower device.

In some implementations of the method, the non-transitory computer readable medium, and/or the apparatus, the event corresponds to a determination that a state of the follower device changed from not in-use to in-use, and determining the event comprises: detecting a conference participant within a field of view of a camera of the follower device for a threshold period of time.

In some implementations of the method, the non-transitory computer readable medium, and/or the apparatus, the event corresponds to a determination that a state of the follower device changed from not in-use to in-use, and performing the action comprises: automatically initiating a connection of the follower device to the video conference based on the determination that the state of the follower device changed from not in-use to in-use.

In some implementations of the method, the non-transitory computer readable medium, and/or the apparatus, the event corresponds to a determination that a state of the follower device changed from in-use to not in-use, and determining the event comprises: failing to detect for more than a threshold period of time, within a field of view of a camera of the follower device, a conference participant previously within the field of view.

In some implementations of the method, the non-transitory computer readable medium, and/or the apparatus, the event corresponds to a determination that a state of the follower device changed from in-use to not in-use, and performing the action comprises: automatically terminating a connection of the follower device to the video conference based on the determination that the state of the follower device changed from in-use to not in-use.

In some implementations of the method, the non-transitory computer readable medium, and/or the apparatus, the follower device is paired with the leader device using ultrasonic functionality of the leader device.

In some implementations of the method, the non-transitory computer readable medium, and/or the apparatus, the follower device is one of a plurality of personal computing devices at fixed locations within the physical space.

In some implementations of the method, the non-transitory computer readable medium, and/or the apparatus, the companion mode designation enables the leader device to maintain control over the follower device for the video conference.

In some implementations of the method, the non-transitory computer readable medium, and/or the apparatus, determining the event comprises one of: determining that the follower device changed from not in-use to in-use; or determining that the follower device changed from in-use to not in-use.

In some implementations of the method, the non-transitory computer readable medium, and/or the apparatus, performing the action comprises one of: connecting the follower device to the video conference; or disconnecting the follower device from the video conference.

In some implementations of the method, the non-transitory computer readable medium, and/or the apparatus, the follower device is paired to the leader device while the video conference is in-progress.

In some implementations of the method, the non-transitory computer readable medium, and/or the apparatus, the action is initiated by the leader device based on the companion mode designation of the follower device.

In some implementations of the method, the non-transitory computer readable medium, and/or the apparatus, the event corresponds to a change in use of the follower device.

In some implementations of the method, the non-transitory computer readable medium, and/or the apparatus, the action is initiated by the leader device.

In some implementations of the method, the non-transitory computer readable medium, and/or the apparatus, the follower device is paired to the leader device using ultrasonic functionality of the leader device.

In some implementations of the method, the non-transitory computer readable medium, and/or the apparatus, where the event corresponds to the follower device changing from not in-use to in-use, the action includes enabling use of the follower device in connection with the video conference.

In some implementations of the method, the non-transitory computer readable medium, and/or the apparatus, where the event corresponds to the follower device changing from in-use to not in-use, the action includes disabling use of the follower device in connection with the video conference.

In some implementations of the method, the non-transitory computer readable medium, and/or the apparatus, the event is determined using data captured using a camera of the follower device.

In some implementations, a method comprises, a non-transitory computer readable medium stores instructions operable to cause one or more processors to perform operations comprising, and/or a system comprises a memory subsystem storing instructions and processing circuitry configured to execute the instructions for: pairing a follower device within a physical space to a leader device within the physical space to enable a companion mode designation for the follower device during a video conference; based on a connection of the leader device to the video conference: causing the follower device to connect to the video conference according to the companion mode designation; and obtaining name information identifying a conference participant using the follower device; and updating a representation of the follower device within the video conference to indicate the name information.

In some implementations of the method, the non-transitory computer readable medium, and/or the apparatus, causing the follower device to connect to the video conference comprises: using a same participant account used with the leader device to initiate a connection of the follower device to the video conference.

In some implementations of the method, the non-transitory computer readable medium, and/or the apparatus, obtaining the name information of the conference participant comprises at least one of: obtaining text input from a user of the follower device; obtaining text input from a user of the leader device; or capturing an image using a camera of the follower device.

In some implementations of the method, the non-transitory computer readable medium, and/or the system, the follower device is one of multiple follower devices paired to the leader device, and the method comprises, the operations comprise, and/or the processing circuitry is configured to execute the instructions for: determining ones of the multiple follower devices having cameras with fields of view depicting the conference participant; determining a select video stream representing the conference participant from amongst candidate video streams captured at the ones of the multiple follower devices; and updating a user interface tile associated with the representation of the conference participant to show the video stream.

In some implementations of the method, the non-transitory computer readable medium, and/or the system, the method comprises, the operations comprise, and/or the processing circuitry is configured to execute the instructions for: determining an in-use state of the follower device based on a detection of the conference participant within a field of view of a camera of the follower device for more than a threshold period of time.

In some implementations of the method, the non-transitory computer readable medium, and/or the apparatus, the follower device is a personal computing device at a fixed location within the physical space.

In some implementations of the method, the non-transitory computer readable medium, and/or the apparatus, the follower device is a digital whiteboard device configured for movement into and out of the physical space.

In some implementations of the method, the non-transitory computer readable medium, and/or the apparatus, the companion mode designation enables the leader device maintains control over the follower device for the video conference.

In some implementations of the method, the non-transitory computer readable medium, and/or the apparatus, pairing the follower device to the leader device authenticates the follower device for the video conference.

In some implementations of the method, the non-transitory computer readable medium, and/or the apparatus, the follower device connects to the video conference using a same participant account as is used to connect the leader device to the video conference.

In some implementations of the method, the non-transitory computer readable medium, and/or the apparatus, the follower device is connected to the video conference based on the connection of the leader device to the video conference and based on a determination that the follower device is in-use.

In some implementations of the method, the non-transitory computer readable medium, and/or the apparatus, the leader device maintains control over the follower device during the video conference.

In some implementations of the method, the non-transitory computer readable medium, and/or the system, causing the follower device to connect to the video conference according to the companion mode designation comprises: transmitting, from the leader device, a signal indicating to initiate a connection of a client application running at the follower device to the video conference.

In some implementations of the method, the non-transitory computer readable medium, and/or the apparatus, the connection of the follower device to the conference is based on a detection of the conference participant within a field of view of a camera of the follower device.

In some implementations of the method, the non-transitory computer readable medium, and/or the system, the method comprises, the operations comprise, and/or the processing circuitry is configured to execute the instructions for: transmitting, from the leader device, a signal indicating to disconnect the follower device from the video conference.

In some implementations of the method, the non-transitory computer readable medium, and/or the apparatus, the follower device and the leader device are represented as a single logical entity within the video conference.

In some implementations of the method, the non-transitory computer readable medium, and/or the apparatus, the name information is obtained using a near field communications sensor associated with the physical space.

In some implementations of the method, the non-transitory computer readable medium, and/or the apparatus, the follower device is one of a tablet computer, a laptop computer, or a digital whiteboard device.

In some implementations, a method comprises, a non-transitory computer readable medium stores instructions operable to cause one or more processors to perform operations comprising, and/or a system comprises a memory subsystem storing instructions and processing circuitry configured to execute the instructions for: designating multiple displays located at a physical space as follower devices, wherein follower device designations of the multiple displays enables a leader device located at the physical space to control the multiple displays for a video conference; and enforcing a configuration to cause, during the video conference, an output of first visual data associated with the video conference at a first display of the multiple displays and an output of second visual data associated with the video conference at a second display of the multiple displays.

In some implementations of the method, the non-transitory computer readable medium, and/or the apparatus, enforcing the configuration comprises: transmitting, by the leader device, a signal indicating to cause the output of the first visual data at the first display and the output of the second visual data at the second display.

In some implementations of the method, the non-transitory computer readable medium, and/or the system, the configuration corresponds to configuration logic defined for the video conference, and the method comprises, the operations comprise, and/or the processing circuitry is configured to execute the instructions for: defining the configuration logic to specify indicate visual data to output to specific displays of the multiple displays.

In some implementations of the method, the non-transitory computer readable medium, and/or the apparatus, designating the multiple displays as follower devices comprises: authenticating the multiple displays for the video conference based on connections of the multiple displays to the leader device.

In some implementations of the method, the non-transitory computer readable medium, and/or the apparatus, the first visual data corresponds to one or more first conference participant video streams and the second visual data corresponds to one or more second conference participant video streams.

In some implementations of the method, the non-transitory computer readable medium, and/or the apparatus, the first visual data corresponds to first video conference functionality and the second visual data corresponds to second video conference functionality.

In some implementations of the method, the non-transitory computer readable medium, and/or the apparatus, the first visual data corresponds to one or more conference participant video streams and the second visual data corresponds to functionality of the video conference.

In some implementations of the method, the non-transitory computer readable medium, and/or the apparatus, the leader device and the follower devices are collectively represented as a single logical entity within the video conference.

In some implementations of the method, the non-transitory computer readable medium, and/or the apparatus, the configuration is based on configuration logic defined for the physical space.

In some implementations of the method, the non-transitory computer readable medium, and/or the apparatus, the method comprises, the operations comprise, and/or the processing circuitry is configured to execute the instructions for: pairing each of the multiple displays to the leader device for the video conference.

In some implementations of the method, the non-transitory computer readable medium, and/or the apparatus, the first display and the second display are displays of separate digital whiteboard devices.

In some implementations of the method, the non-transitory computer readable medium, and/or the apparatus, the configuration is based on capabilities of the first display and the second display.

In some implementations of the method, the non-transitory computer readable medium, and/or the apparatus, the first visual data corresponds to a first arrangement of conference participant video streams and the second visual data corresponds to a second arrangement of one or more of the conference participant video streams.

In some implementations of the method, the non-transitory computer readable medium, and/or the apparatus, the first visual data corresponds to conference participant video streams and the second visual data corresponds to a digital whiteboard.

In some implementations of the method, the non-transitory computer readable medium, and/or the apparatus, the first visual data corresponds to conference participant video streams and the second visual data corresponds to chat messages associated with the video conference.

In some implementations of the method, the non-transitory computer readable medium, and/or the apparatus, the first visual data corresponds to conference participant video streams and the second visual data corresponds to screen share media of the video conference.

In some implementations of the method, the non-transitory computer readable medium, and/or the apparatus, the first visual data corresponds to conference participant video streams and the second visual data corresponds to a user interface including host controls for the video conference.

In some implementations of the method, the non-transitory computer readable medium, and/or the apparatus, the first visual data corresponds to a first digital whiteboard and the second visual data corresponds to a second digital whiteboard.

In some implementations, a method comprises, a non-transitory computer readable medium stores instructions operable to cause one or more processors to perform operations comprising, and/or a system comprises a memory subsystem storing instructions and processing circuitry configured to execute the instructions for: identifying multiple cameras located at a physical space and connected to a leader device within the physical space; designating the multiple cameras as follower devices for a video conference, wherein follower device designations of the multiple cameras enables the leader device to control the multiple cameras during the video conference; causing each camera of the multiple cameras to determine and capture a select video stream depicting one or more conference participants within the physical space; and using at least some of the select video streams to represent the physical space within the video conference.

In some implementations of the method, the non-transitory computer readable medium, and/or the apparatus, the leader device and each of the follower devices is collectively represented as a single logical entity within the video conference.

In some implementations of the method, the non-transitory computer readable medium, and/or the apparatus, causing each camera to determine and capture the select video streams comprises: transmitting, from the leader device, a signal to a camera of the multiple cameras to use selection software at the camera to determine the select video stream from amongst a plurality of candidate video streams.

In some implementations of the method, the non-transitory computer readable medium, and/or the system, the multiple cameras are a first set of the follower devices, and the method comprises, the operations comprise, and/or the processing circuitry is configured to execute the instructions for: designating one or more computing devices located at the physical space as a second set of the follower devices; and causing a camera of each of the one or more computing devices to capture a select video stream.

In some implementations of the method, the non-transitory computer readable medium, and/or the apparatus, using at least some of the select video streams to represent the physical space within the video conference comprises: evaluating, at the leader device, the select video streams to determine the at least some of the select video streams to use.

In some implementations of the method, the non-transitory computer readable medium, and/or the system, the method comprises, the operations comprise, and/or the processing circuitry is configured to execute the instructions for: pushing selection software usable to determine a select video stream to each camera of the cameras prior to the video conference.

In some implementations of the method, the non-transitory computer readable medium, and/or the apparatus, identifying the multiple cameras comprises: determining that the multiple cameras are available for the leader device to use with the video conference.

In some implementations of the method, the non-transitory computer readable medium, and/or the apparatus, control of the multiple cameras by the leader device for the video conference is based on configuration logic defined for the video conference.

In some implementations of the method, the non-transitory computer readable medium, and/or the apparatus, the multiple cameras include selection software for determining and capturing the select video streams.

In some implementations of the method, the non-transitory computer readable medium, and/or the apparatus, other follower devices at the physical space are also under control of the leader device during the video conference.

In some implementations of the method, the non-transitory computer readable medium, and/or the apparatus, using the at least some of the select video streams to represent the physical space within the video conference comprises: obtaining the select video streams from the multiple cameras; and transmitting the at least some of the select video streams to a server used to facilitate the video conference.

In some implementations of the method, the non-transitory computer readable medium, and/or the apparatus, at least one camera of the multiple cameras is a camera of a companion device located at the physical space.

In some implementations of the method, the non-transitory computer readable medium, and/or the apparatus, identifying the multiple cameras comprises: authenticating the multiple cameras for use with the video conference.

In some implementations of the method, the non-transitory computer readable medium, and/or the apparatus, the leader device, the multiple cameras, and one or more other follower devices are collectively represented as a single logical entity within the video conference.

In some implementations of the method, the non-transitory computer readable medium, and/or the system, the method comprises, the operations comprise, and/or the processing circuitry is configured to execute the instructions for: revoking the follower device designation of the multiple cameras at an end of the video conference.

In some implementations of the method, the non-transitory computer readable medium, and/or the apparatus, the follower device designation of the multiple cameras is based on configuration logic defined for the video conference.

In some implementations of the method, the non-transitory computer readable medium, and/or the apparatus, the multiple cameras include a dedicated camera unit and a camera of a companion device located at the physical space.

In some implementations of the method, the non-transitory computer readable medium, and/or the apparatus, selection software running at the multiple cameras and used by the multiple cameras to determine and capture the select video streams is pushed to each of the multiple cameras prior to the video conference.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hardwired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

pairing a follower device within a physical space to a leader device within the physical space to enable a companion mode designation for the follower device during a video conference;

determining, based on a connection of the leader device to the video conference and based on the pairing, an event associated with the follower device; and performing, based on the event and the companion mode designation of the follower device, an action associated with the follower device, wherein the leader device is a shared computing device and the follower device is a personal computing device, wherein the follower device connects to the video conference via the leader device based on a connection between the leader device and a server-side multimedia router associated with the video conference, and wherein the companion mode designation for the follower device causes a representation of the leader device and the follower device collectively as a single conference participant within a participant list of the video conference and enables the leader device to control the follower device during the video conference via the connection between the leader device and the server-side multimedia router.

2. The method of claim 1, wherein the event corresponds to a determination that a state of the follower device changed from not in-use to in-use, and wherein determining the event comprises:

detecting a conference participant within a field of view of a camera of the follower device for a threshold period of time.

3. The method of claim 1, wherein the event corresponds to a determination that a state of the follower device changed from not in-use to in-use, and wherein performing the action comprises:

automatically initiating a connection of the follower device to the video conference based on the determination that the state of the follower device changed from not in-use to in-use.

4. The method of claim 1, wherein the event corresponds to a determination that a state of the follower device changed from in-use to not in-use, and wherein determining the event comprises:

failing to detect for more than a threshold period of time, within a field of view of a camera of the follower device, a conference participant previously within the field of view.

5. The method of claim 1, wherein the event corresponds to a determination that a state of the follower device changed from in-use to not in-use, and wherein performing the action comprises:

automatically terminating a connection of the follower device to the video conference based on the determination that the state of the follower device changed from in-use to not in-use.

6. The method of claim 1, wherein the follower device is paired with the leader device using ultrasonic functionality of the leader device.

7. The method of claim 1, wherein the follower device is one of a plurality of personal computing devices at fixed locations within the physical space.

8. The method of claim 1, wherein the companion mode designation enables the leader device to maintain control over the follower device for the video conference.

9. A non-transitory computer readable medium storing instructions operable to cause one or more processors to perform operations comprising:

pairing a follower device within a physical space to a leader device within the physical space to enable a companion mode designation for the follower device during a video conference;

determining, based on a connection of the leader device to the video conference and based on the pairing, an event associated with the follower device; and performing, based on the event and the companion mode designation of the follower device, an action associated with the follower device, wherein the leader device is a shared computing device and the follower device is a personal computing device, wherein the follower device connects to the video conference via the leader device based on a connection between the leader device and a server-side multimedia router associated with the video conference, and wherein the companion mode designation for the follower device causes a representation of the leader device and the follower device collectively as a single conference participant within a participant list of the video conference and enables the leader device to control the follower device during the video conference via the connection between the leader device and the server-side multimedia router.

10. The non-transitory computer readable medium of claim 9, wherein determining the event comprises one of:

determining that the follower device changed from not in-use to in-use; or determining that the follower device changed from in-use to not in-use.

11. The non-transitory computer readable medium of claim 9, wherein performing the action comprises one of:

connecting the follower device to the video conference; or disconnecting the follower device from the video conference.

12. The non-transitory computer readable medium of claim 9, wherein the follower device is paired to the leader device while the video conference is in-progress.

13. The non-transitory computer readable medium of claim 9, wherein the action is initiated by the leader device based on the companion mode designation of the follower device.

14. A system, comprising:

a memory subsystem storing instructions; and processing circuitry configured to execute the instructions to:

pair a follower device within a physical space to a leader device within the physical space to enable a companion mode designation for the follower device during a video conference;

determine, based on a connection of the leader device to the video conference and based on the pairing, an event associated with the follower device; and perform, based on the event and the companion mode designation of the follower device, an action associated with the follower device, wherein the leader device is a shared computing device and the follower device is a personal computing device, wherein the follower device connects to the video conference via the leader device based on a connection between the leader device and a server-side multimedia router associated with the video conference, and wherein the companion mode designation for the follower device causes a representation of the leader device and the follower device collectively as a single conference participant within a participant list of the video conference and enables the leader device to control the follower device during the video conference via the connection between the leader device and the server-side multimedia router.

15. The system of claim 14, wherein the event corresponds to a change in use of the follower device.

16. The system of claim 14, wherein the action is initiated by the leader device.

17. The system of claim 14, wherein the follower device is paired to the leader device using ultrasonic functionality of the leader device.

18. The system of claim 14, wherein, where the event corresponds to the follower device changing from not in-use to in-use, the action includes enabling use of the follower device in connection with the video conference.

19. The system of claim 14, wherein, where the event corresponds to the follower device changing from in-use to not in-use, the action includes disabling use of the follower device in connection with the video conference.

20. The system of claim 14, wherein the event is determined using data captured using a camera of the follower device.

* * * * *